(12) United States Patent
Honsowetz et al.

(10) Patent No.: US 11,610,059 B2
(45) Date of Patent: Mar. 21, 2023

(54) SYSTEMS AND METHODS FOR A VISUAL INTERFACE FOR GRID-BASED PROGRAMS

(71) Applicant: Interject Data System, Inc., Vancouver, WA (US)

(72) Inventors: Jeffrey Dean Honsowetz, Vancouver, WA (US); Eugene Lyubar, Vancouver, WA (US); Patrick DeBuse, Amboy, WA (US)

(73) Assignee: Interject Data System, Inc., Vancouver, WA (US)

( * ) Notice: Subject to any disclaimer, the term of this patent is extended or adjusted under 35 U.S.C. 154(b) by 171 days.

(21) Appl. No.: 16/706,362

(22) Filed: Dec. 6, 2019

(65) Prior Publication Data
US 2020/0184149 A1    Jun. 11, 2020

Related U.S. Application Data

(60) Provisional application No. 62/776,887, filed on Dec. 7, 2018.

(51) Int. Cl.
*G06F 40/00* (2020.01)
*G06F 40/211* (2020.01)
(Continued)

(52) U.S. Cl.
CPC .......... *G06F 40/211* (2020.01); *G06F 3/0482* (2013.01); *G06F 3/04845* (2013.01); *G06F 40/18* (2020.01)

(58) Field of Classification Search
CPC .. G06F 40/211; G06F 3/0482; G06F 3/04845; G06F 40/18
See application file for complete search history.

(56) References Cited

U.S. PATENT DOCUMENTS 5,481,741 A * 1/1996 McKaskle ................. G06F 8/34
358/1.9
5,862,379 A   1/1999 Rubin et al.
(Continued)

OTHER PUBLICATIONS

Screen captures from YouTube video clip entitled "Basic Excel Formulas—Add, Subtract, Divide, Multiply" 3 pages, uploaded on Jul. 16, 2013 by user "Computerbasics". Retrieved from Internet: <https://www.youtube.com/watch?v=1naiWCWfSt4&t=296s>.*

*Primary Examiner* — William L Bashore
*Assistant Examiner* — David Faber
(74) *Attorney, Agent, or Firm* — McCoy Russell LLP

(57) ABSTRACT

The current disclosure provides techniques for visualizing text expressions in spreadsheet cells in a more intuitive and user friendly manner by mapping syntactic elements of the text expressions to two-dimensional (2D) configurations of 2D elements, and displaying the 2D configurations in a graphical user interface, wherein the syntactic relationships between syntactic elements in the text expressions are rendered as spatial relationships between the 2D elements in the 2D configuration. In one embodiment, a method for converting a text expression into a 2D configuration comprises selecting a spreadsheet cell based on input received from a user input device, wherein the spreadsheet cell comprises a text expression, parsing the text expression, using a logic subsystem, into at least a first syntactic element, mapping the first syntactic element, using the logic subsystem, to a first two-dimensional (2D) element, and displaying the first 2D element in a graphical user interface via a display subsystem.

19 Claims, 17 Drawing Sheets

(51) Int. Cl.
  *G06F 3/0482*   (2013.01)
  *G06F 40/18*    (2020.01)
  *G06F 3/04845*  (2022.01)

(56) References Cited

U.S. PATENT DOCUMENTS

| | | | |
|---|---|---|---|
| 6,489,970 B1 | 12/2002 | Pazel | |
| 6,766,509 B1 | 7/2004 | Sheretov et al. | |
| 6,934,696 B1 * | 8/2005 | Williams | G06N 5/022 |
| | | | 706/46 |
| 6,973,649 B1 | 12/2005 | Pazel | |
| 7,107,519 B1 | 9/2006 | Webster et al. | |
| 7,266,763 B2 | 9/2007 | Peyton-Jones et al. | |
| 7,840,889 B2 | 11/2010 | Mantuano et al. | |
| 7,984,371 B2 * | 7/2011 | Zdenek | G06F 40/111 |
| | | | 715/761 |
| 8,291,408 B1 | 10/2012 | Czymontek | |
| 8,352,903 B1 | 1/2013 | Friedman | |
| 8,407,668 B2 | 3/2013 | Lindhorst | |
| 8,712,953 B2 | 4/2014 | Beringer et al. | |
| 8,924,926 B1 | 12/2014 | Fraser | |
| 8,972,240 B2 * | 3/2015 | Brockett | G06F 40/131 |
| | | | 707/706 |
| 9,047,266 B2 | 6/2015 | Chavoustie et al. | |
| 9,158,832 B1 * | 10/2015 | Hiatt | G06F 40/14 |
| 9,595,202 B2 | 3/2017 | Chong et al. | |
| 9,747,270 B2 | 8/2017 | Campbell et al. | |
| 2005/0081141 A1 | 4/2005 | Jonsson | |
| 2006/0053363 A1 * | 3/2006 | Bargh | G06F 40/18 |
| | | | 715/213 |
| 2006/0224946 A1 | 10/2006 | Barrett | |
| 2006/0271908 A1 * | 11/2006 | Bargh | G06T 11/60 |
| | | | 717/100 |
| 2007/0244672 A1 * | 10/2007 | Kjaer | G06F 40/18 |
| | | | 703/2 |
| 2009/0172526 A1 | 7/2009 | Sorenson | |
| 2012/0042242 A1 * | 2/2012 | Garland | G06F 40/111 |
| | | | 715/256 |
| 2014/0136939 A1 * | 5/2014 | Chan | G06F 40/18 |
| | | | 715/227 |
| 2016/0162461 A1 * | 6/2016 | Simon | G06F 40/18 |
| | | | 715/220 |

* cited by examiner

FIG. 2
(PRIOR ART)

| | A | B | C | D | E | F | G | H | I | J | K | L | M |
|---|---|---|---|---|---|---|---|---|---|---|---|---|---|
| G26 | | | | | fx | | =IF(G$25>=$E26,"Success",IF((G$25+0.05)>=$E26,"Almost","Missed")) | | | | | | |
| 1 | Financial Proforma | | | | | | | | | | | | |
| 2 | | | | | | | | | 2018 | | | | |
| 3 | | | | | | | Jan | Feb | Mar | Q1 Total | | | |
| 4 | Work Days | | | | | | 23 | 20 | 22 | 65 | | | |
| 6 | Revenue | | | | | | | | | | | | |
| 7 | | License Revenue | | | | | 20,000 | 24,000 | 28,800 | 72,800 | | | |
| 8 | | Service Revenue | | | | | 30,000 | 36,000 | 43,200 | 109,200 | | | |
| 9 | Total Revenue | | | | | | 50,000 | 60,000 | 72,000 | 182,000 | | | |
| 11 | Expenses | | | | | | | | | | | | |
| 12 | | Labor | | | | | 24,500 | 26,950 | 29,645 | 81,095 | | | |
| 13 | | Rent | | | | | 4,500 | 4,950 | 5,445 | 14,895 | | | |
| 14 | | Utilities | | | | | 2,000 | 2,200 | 2,420 | 6,620 | | | |
| 15 | | Technology | | | | | 3,560 | 3,916 | 4,308 | 11,784 | | | |
| 16 | | Other | | | | | 2,050 | 2,255 | 2,481 | 6,786 | | | |
| 17 | Total Expenses | | | | | | 36,610 | 40,271 | 44,298 | 121,179 | | | |
| 19 | Net Income | | | | | | 13,390 | 19,729 | 27,702 | 60,821 | | | |
| 21 | Estimated Taxes | | | | 35% | | 4,687 | 6,905 | 9,696 | 21,287 | | | |
| 23 | Net Income After Taxes | | | | | | 8,704 | 12,824 | 18,006 | 39,534 | | | |
| 25 | % of Revenue | | | | 25% | | 17% | 21% | 25% | 22% | | | |
| 26 | Goal Assessment | | | | | | Missed | Almost | Success | | | | |
| 27 | | | | | | | | | | | | | |

202 (formula bar), 204 (Missed cell callout), 200

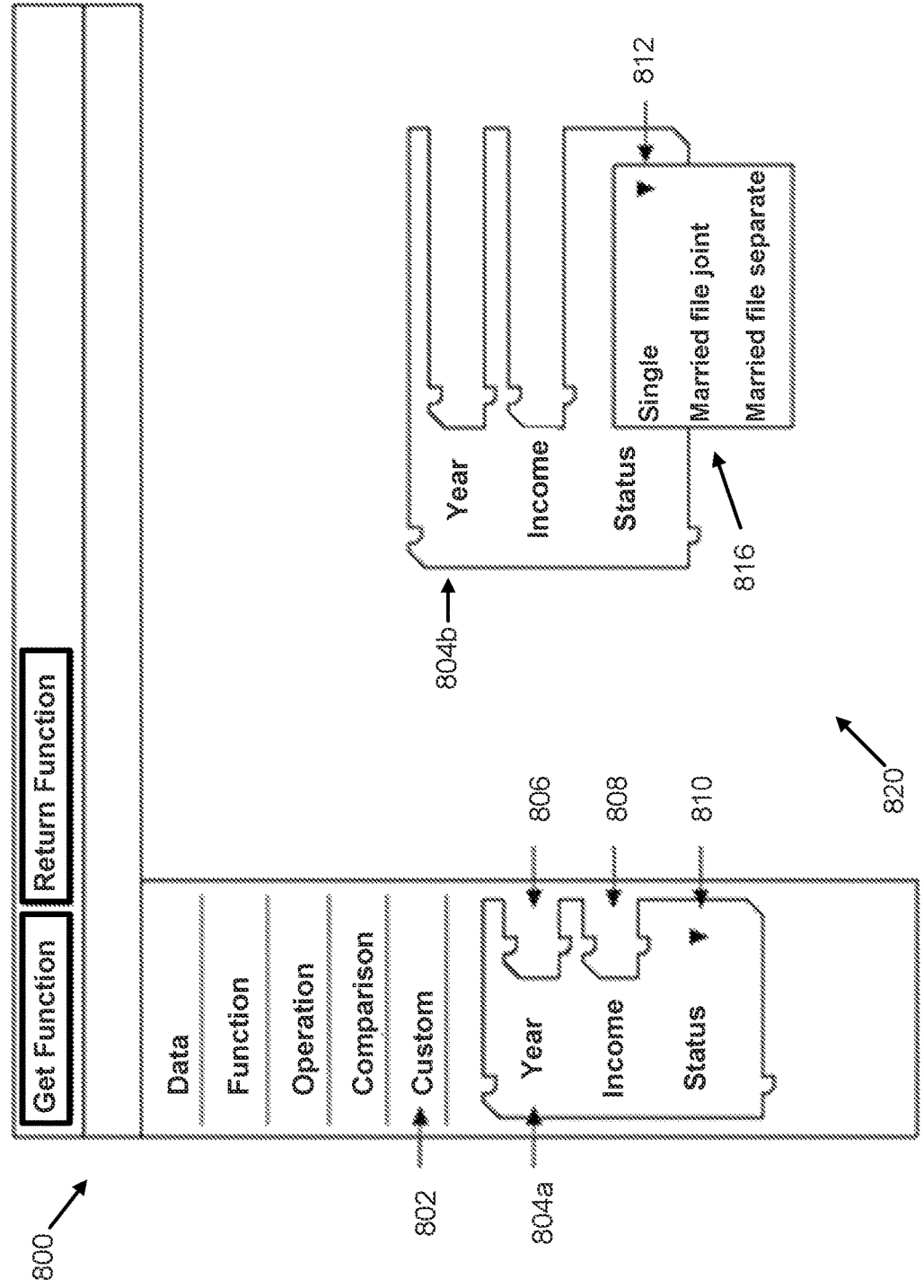

SYSTEMS AND METHODS FOR A VISUAL INTERFACE FOR GRID-BASED PROGRAMS

CROSS REFERENCE TO RELATED APPLICATIONS

This application claims priority to U.S. Provisional Application No. 62/776,887, entitled "SYSTEMS AND METHODS FOR A VISUAL INTERFACE FOR GRID-BASED PROGRAMS", filed Dec. 7, 2018, the entire contents of which is hereby incorporated by reference in its entirety for all purposes.

FIELD

The present description relates generally to systems and methods for a visual interface for grid-based software. More particularly, the present description relates to systems and methods for visual programming of text expressions in grid-based software.

BACKGROUND

Grid or table-based computer applications or displays, such as spreadsheet applications, are frequently used to access and interact with data. Generally, data in a spreadsheet may be manipulated in a variety of user-dependent ways using text notations or functions made of text notations. Currently, functions are manually typed or placed in a cell or cells of a spreadsheet as text expressions. These text expressions are generally alphanumeric characters and may contain parenthetically nested and/or concatenated, comma separated lists.

Complex functions/text expressions entered into a spreadsheet cell may comprise many individual arguments embedded within one another, many of which may contain additional, nested/embedded equations of their own. Formulas written into spreadsheet cells as text expressions provide frequent opportunities for typographical or logical errors. For example, users may be unclear about, or may mistakenly disorder, the sequence of expressions/symbols necessary to affect a desired outcome. If errors are made while inputting an equation into a spreadsheet cell, identifying and isolating the error in a complex text expression can be challenging, as the visual presentation of the text expression may comprise a linear string of characters, with many nested arguments. Further, different users may have different levels of familiarity with spreadsheet syntax required to interact with data, and may be unfamiliar with the specific syntax necessary to affect a desired outcome. Therefore, it is generally desirable to explore techniques for enabling a user to view and interact with data, formulae, etc. in a table or grid based context, in a more intuitive and user friendly manner.

SUMMARY

Provided herein are methods and systems having an intuitive user interface for creating, accessing, and manipulating text expressions in one or more cells of computer based grid or table-based applications. More particularly, provided herein are methods and systems for converting text expressions to intuitive two-dimensional (2D) configurations representing the syntactic elements and syntactic relationships of the text expression via 2D elements in pre-defined spatial relationships. The current disclosure further provides for generating 2D configurations and mapping the 2D configurations to text expressions. In one embodiment, a method for converting a text expression in a cell of a spreadsheet comprises selecting a spreadsheet cell based on input received from a user input device, wherein the spreadsheet cell comprises a text expression; parsing the text expression, using a logic subsystem, into at least a first syntactic element; mapping the first syntactic element, using the logic subsystem, to a first two-dimensional (2D) element; and displaying the first 2D element in a graphical user interface via a display subsystem.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 2 depicts a conventional spreadsheet.

DETAILED DESCRIPTION

The following description relates to systems and methods for visualizing and manipulating text expressions in cells of a spreadsheet or other grid or table based software application, using two-dimensional configurations (2D configurations) comprised of one or more two dimensional elements (2D elements). The 2D configurations may represent, in a more user friendly and intuitive manner, the same information contained in conventional text expressions such as mathematical and/or logical relationships between data contained in one or more cells of the spreadsheet. The disclosure further provides for modifying the 2D configuration to affect a corresponding modification in the underlying text expression(s), and/or searching a spreadsheet for instances of a text expression using a 2D configuration.

Figure 1:
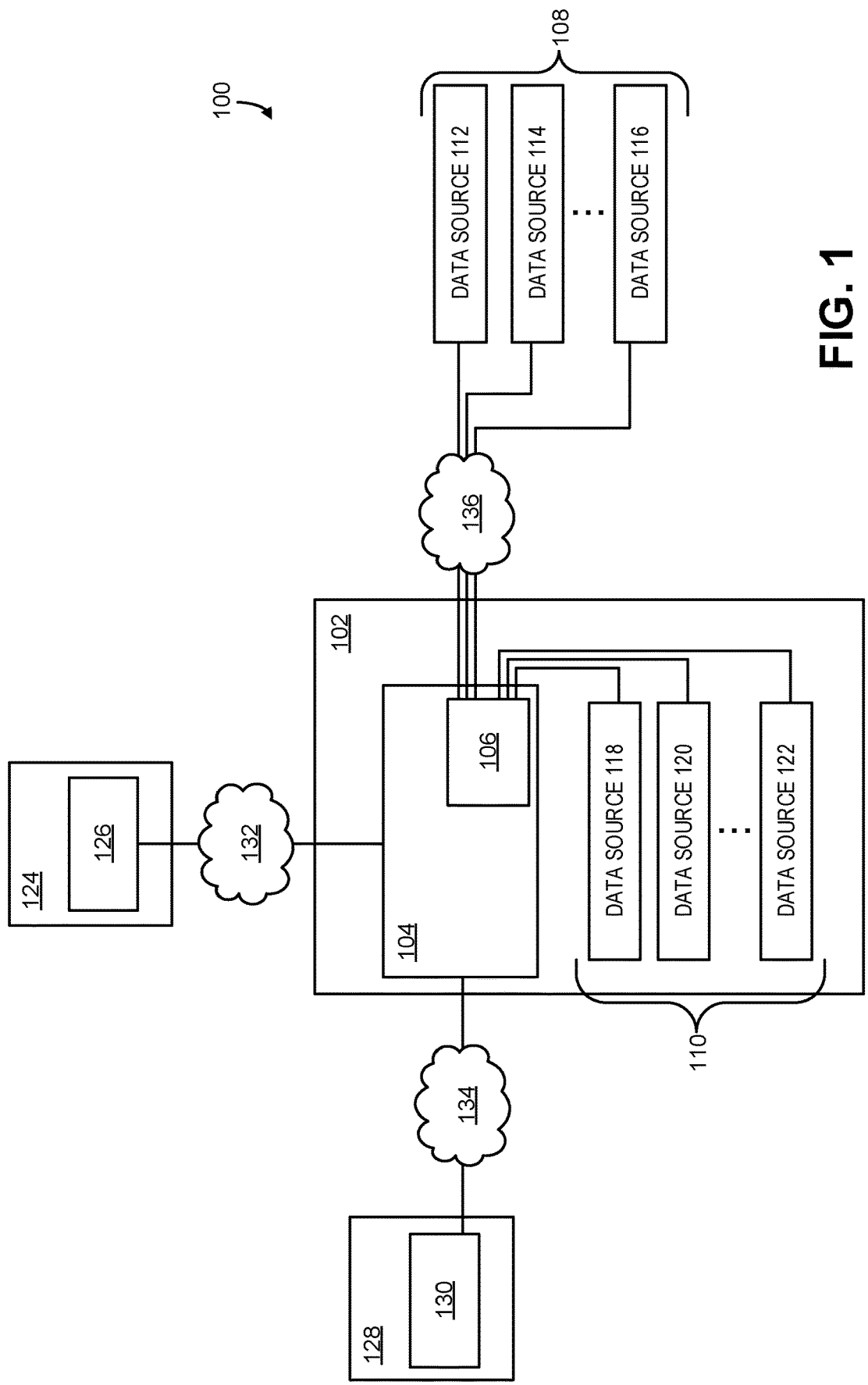
FIG. 1 is a block diagram of an exemplary embodiment of a computing environment.
Figure 12:
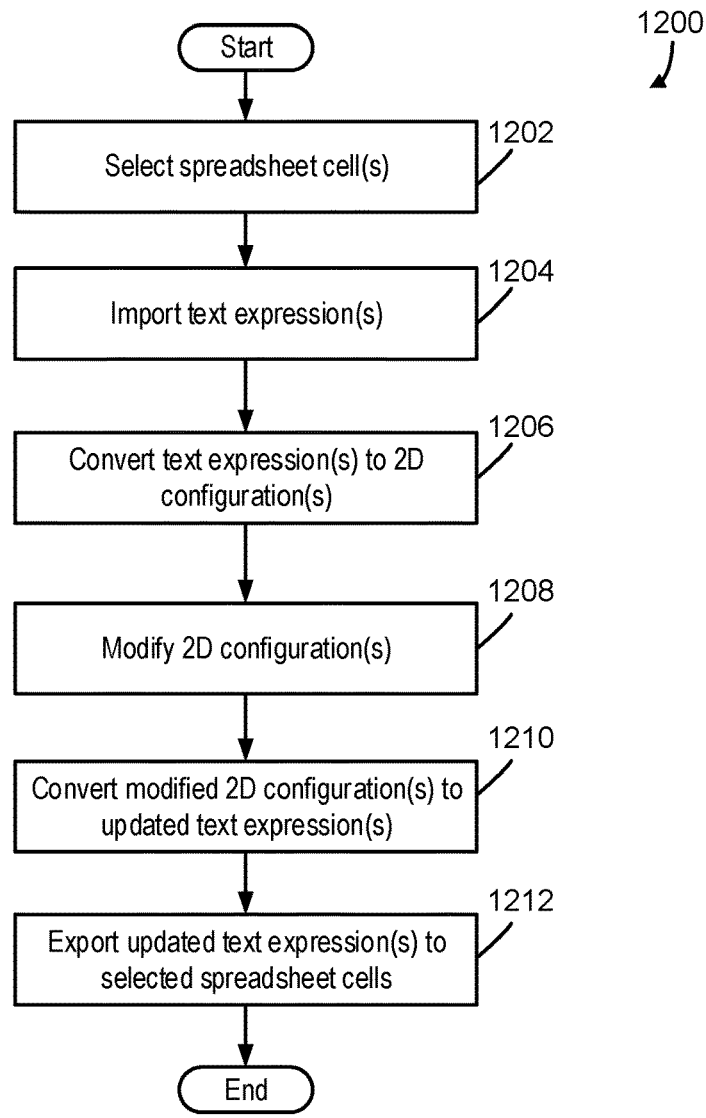
FIG. 12 is a flowchart of an example method for visualizing a text expression as a 2D configuration and modifying the 2D configuration to modify the corresponding text expression.
Figure 13:
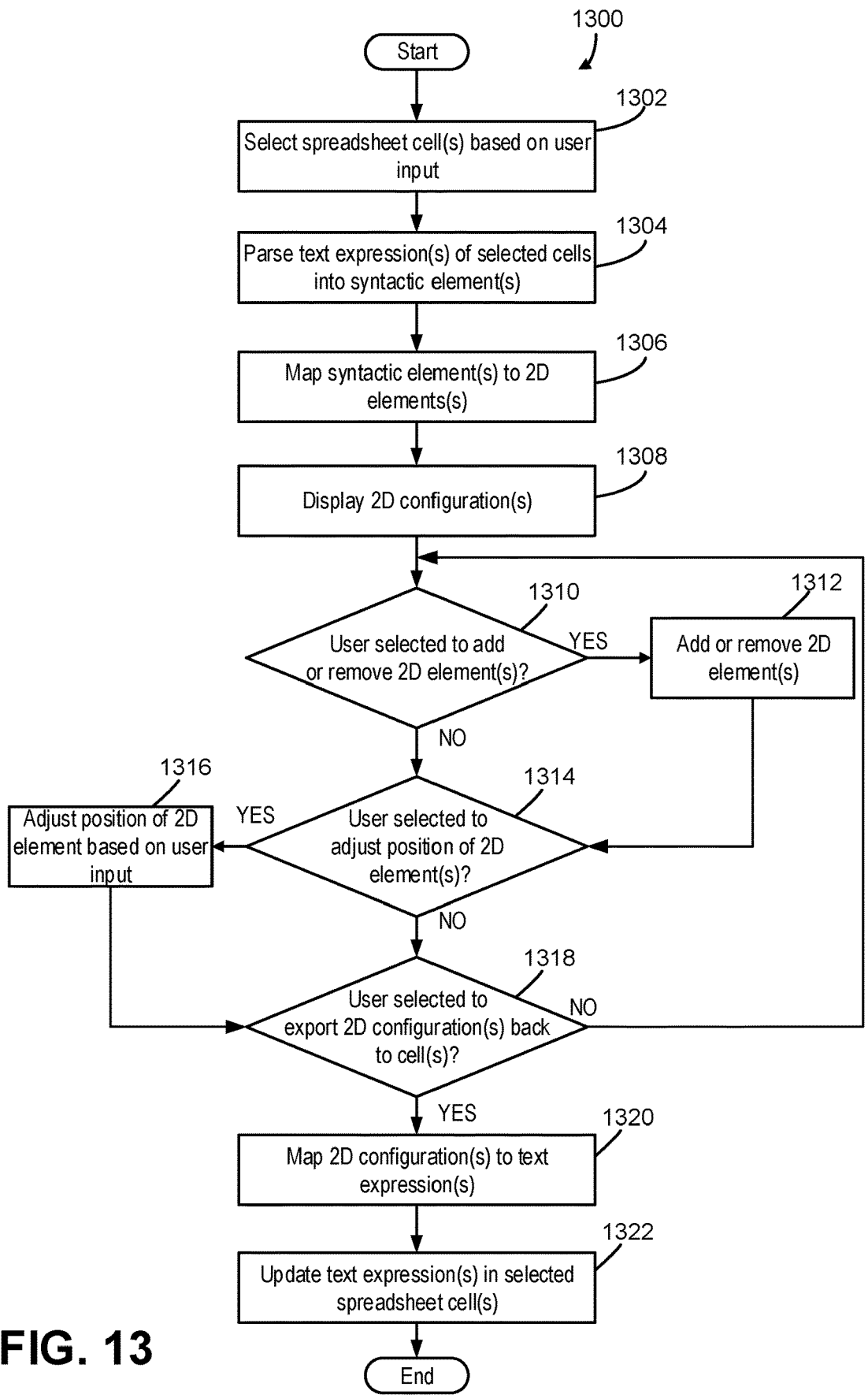
FIG. 13 is a flowchart of an example method for converting a text expression into a 2D configuration by mapping a plurality of syntactic elements to a plurality of 2D elements.
Figure 14:
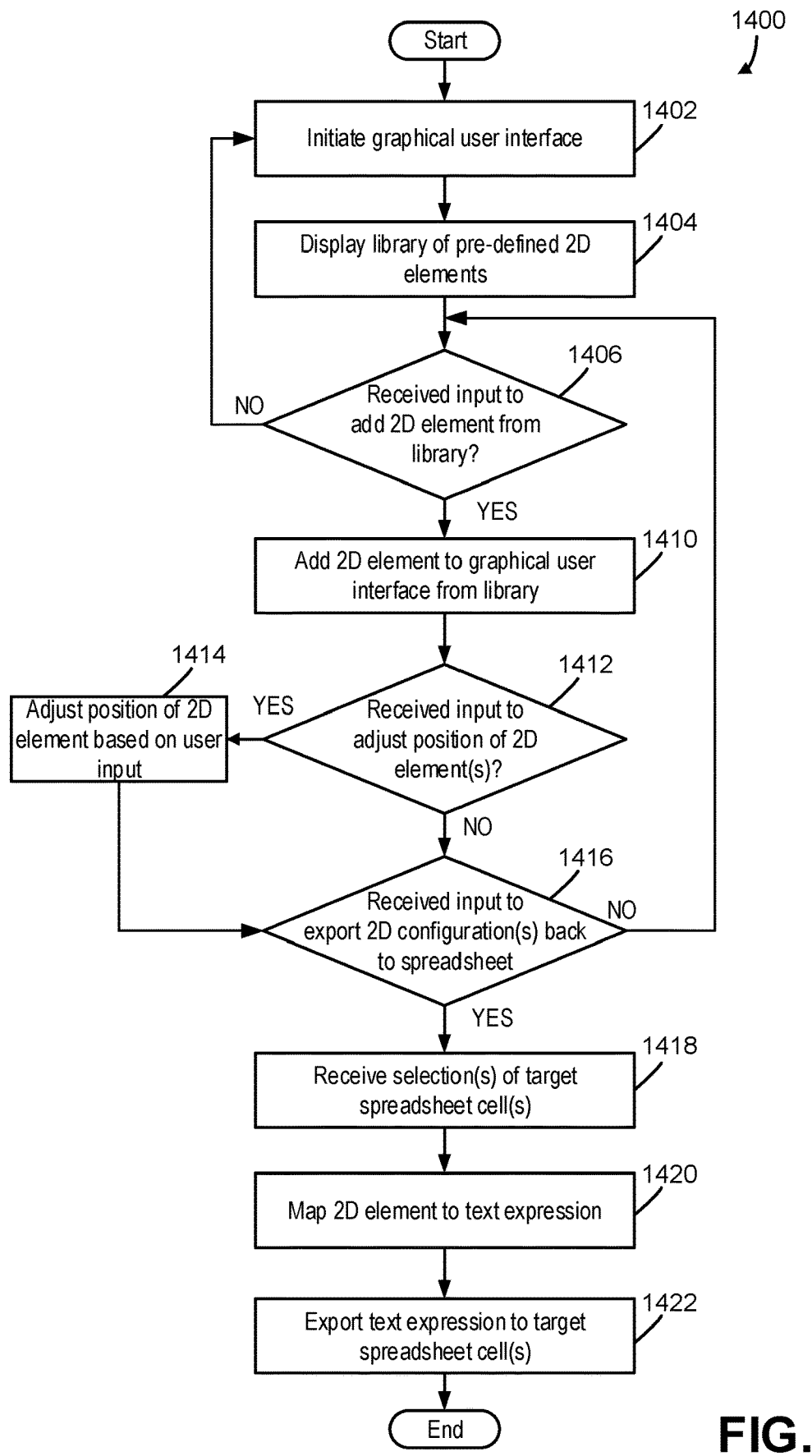
FIG. 14 is a flowchart of an example method for generating a text expression from a 2D configuration.
Figure 15:
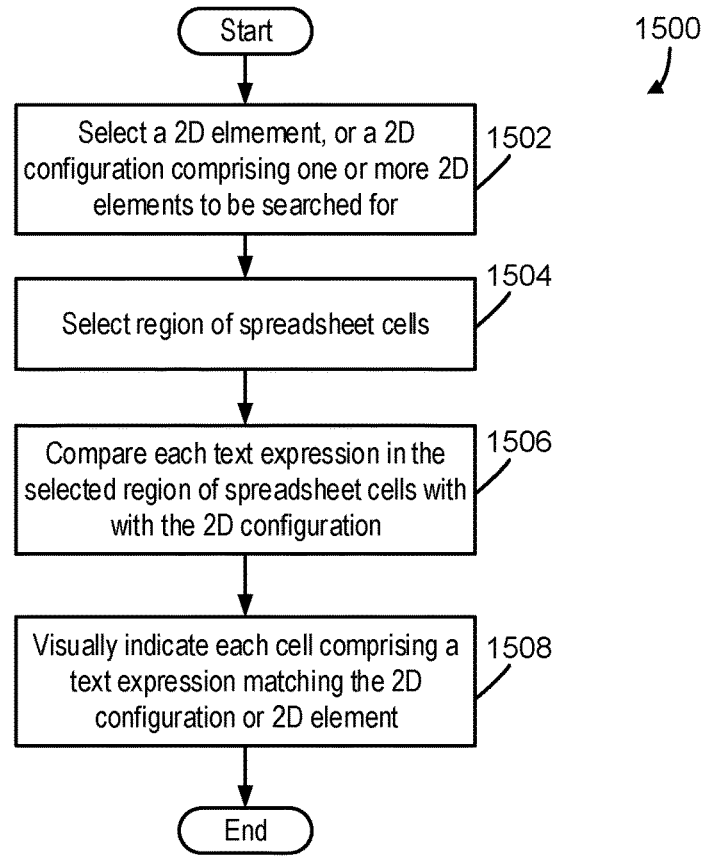
FIG. 15 is a flowchart of an example method for searching a spreadsheet for instances of a text expression based on a 2D configuration.
Figure 16:
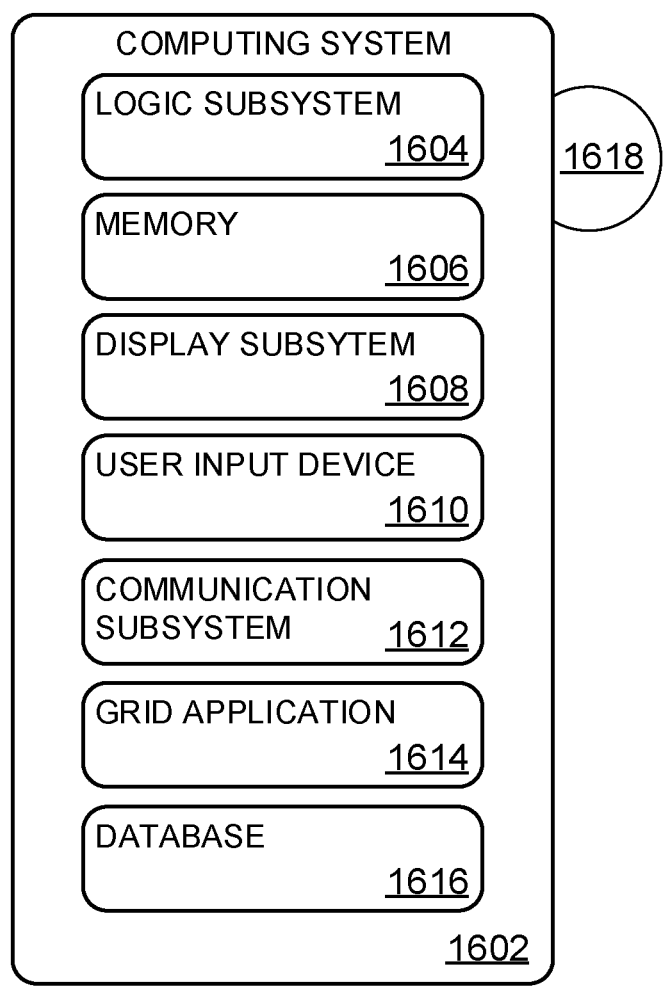
FIG. 16 is an example computing system, according to an exemplary embodiment of the current disclosure.

In one embodiment, FIG. 1 depicts one example of a computing environment, wherein a communicatively coupled computing system may transmit and receive spreadsheet data (or other data) and execute one or more steps of one or more methods herein disclosed. FIG. 2 provides one example of a conventional spreadsheet. FIGS. 3-11 illustrate example GUIs according to embodiments of the current disclosure, which may be implemented as part of one or more methods herein disclosed, and which may enable a computing system to map a text expression of one or more spreadsheet cells to a corresponding 2D configuration comprised of 2D elements, wherein each 2D element may correspond (that is, may symbolize) one or more syntactic elements of the text expression. FIG. 12 depicts a flowchart of an example method for converting a text expression in one or more spreadsheet cells to a 2D configuration which symbolizes the mathematical/logical relationships/expressions contained by the text expression, and which further enables the 2D configuration to be modified, which thereby modifies the corresponding/underlying text expression. FIG. 13 is a flowchart of an example method for mapping a plurality of syntactic elements of a text expression to a 2D configuration comprised of one or more 2D elements, the method further enables addition or removal of 2D elements from a 2D configuration, as well as rearrangement of the 2D elements to produce new/updated 2D configurations corresponding to new/updated text expressions. FIG. 14 shows an example method for generating new/updated text expressions using 2D configurations, which may enable more rapid and less error prone construction of equations, formulae, and other text expressions which a user may input into one or more spreadsheet cells. FIG. 15 shows an example method for searching a spreadsheet, or a sub-region of a spreadsheet, for instances of a text expression using 2D configurations. FIG. 16 shows one example of a computing system, which may implement one or more steps of one or more of the methods herein disclosed.

Grid or table-based computer applications or displays, such as spreadsheet applications, are frequently used to access and interact with data. Generally, data in a spreadsheet may be manipulated in a variety of user-dependent ways using text notations or functions made of text notations. Functions are currently manually typed or placed in a cell or cells of a spreadsheet as text expressions. These text expressions are generally alphanumeric characters and can contain parenthetically nested and/or concatenated, comma separated lists. For example, an equation may be required to calculate the product of two cells and the sum of another two cells, then divide the product by the sum and determine whether the quotient is greater than the value of another spreadsheet cell before performing another set of actions.

Especially complex functions may comprise many individual arguments embedded within one another, many of which may contain numerous equations of their own. For example, conditional or logical functions may have many complex arguments embedded in a nested sequence to calculate a value contingent on the results of a number of other complex functions dependent on a variety of perhaps actively variable data.

Because current methods lack the means for users to easily identify distinct portions of complex formulas rendered as text expressions, the formulas are difficult to read and manage. For example, a conditional formula may be required to complete three functions, each containing two equations and one containing another conditional argument. The interior conditional argument may carry out two equations of its own before performing an action contingent on its own calculations to supply the value for the larger conditional of which it is a component. In current methods, this large conditional may comprise one set of parenthetically separated characters for the conditional it contains, inside of which would be two separate parenthetically contained equations, an IF/ELSE statement, a comparison value, and the decided outcome. Two more parenthetical containers inside the large conditional would themselves contain two parenthetically contained equations and the operation between them, resulting in a multiply-enclosed series, the outcome of which would feed into the overarching conditional. If typed correctly by the user, for example, the conditional may perform two summations of two lists of values, then perform a multiplication on two more sets of values and check if the resultant product is greater or less than a pre-determined value; next, the argument may perform a first action or a second action based on the previous comparison, the outcome of which may be summed along with the sums of the first two summation combinations, the result of which may be compared against a defined value of any complexity before finally performing an action on the data in one or more spreadsheets. With current approaches, each argument, or equation, to be performed must be isolated using parentheses, and each conditional must be separated using commas, resulting in potentially long sequences of nested mathematical expressions whose linear representations in text expressions are unintuitive and become difficult for users to read. Further, it may be difficult in such approaches for users to locate typographical, mathematical, or sequential errors in a given notation or even locate particular components of a formula for observation or alteration. For example, there may be no way to determine which opening parenthesis corresponds with which closing parenthesis or identify if a parenthesis has been omitted, other than by the user manually counting the parentheses in the text expression.

Formulas written as text expressions may also increase the opportunity for typographical or computational errors. For example, users may be unclear about, or may mistakenly disorder, the sequence of operations in an equation necessary to affect a desired outcome. In a text expression comprising several embedded equations, any of which may contain its own embedded equations, there may be several opening parentheses followed by complicated mathematical and/or logical arguments before even the first closing parenthesis occurs. It may be difficult to determine the correct order of equations within the layers of a particular function/text expression. Further, if errors are made, identifying and isolating the source of the error in a complex string can be challenging. When users experience difficulty finding mistakes, or when they create mistakes due to the difficulty in parsing complex text expressions, there may be wide-reaching negative implications. When these spreadsheets form the basis for company-wide templates or regular reporting, the negative implications compound.

Further, different users may have different levels of familiarity with spreadsheet syntax required to interact with data. For example, leadership staff of an enterprise may use their technical expertise to develop a financial report with complex computational formulas in several cells of the spreadsheet. They may then save that template to a central data source for dissemination to regional staff. Those regional users may not have the same expertise, but may nevertheless need to understand or change certain notations, or portions of them, to accommodate their particular data. However, these notations may be highly technical, perhaps employing computational syntax, and therefore reading and/or applying them may require higher levels of expertise than regional staff may currently hold. The complexity and unintuitive nature of text expression based spreadsheet notation approaches thus significantly increase the difficulty of collaborating on common spreadsheet reports, increasing error rates and presenting risks of misunderstanding and misinterpretation of the functions being applied as well as the implications of the resulting data, resulting in decision making based on faulty information.

Identifying and correcting various text based expressions or components of text based expressions in a grid or table based application can also be challenging. Various notations containing the same formula, or the same operation within a formula, may be written in multiple cells of a grid or table. For example, a summation of a specific range of cells within a column may be carried out in multiple different formulas throughout one or more grids, tables, or spreadsheets, as one component of different larger formulas in order to perform different operations on the same set of data. If one or more of those component operations requires alteration, for instance a summation changed to a product due to a mistake or change in data needs, users must manually locate each instance of that component as it occurs nested in each of possibly many different formulas. Because of difficulties in parsing/reading text expression based operations, users may experience significant difficulty not only locating each instance of an operation within a grid or table display but also locating each operation within the larger conditional or equation of which it is part.

There is currently no means of searching, with a single functionality, every instance of a particular string of text entered into a spreadsheet or spreadsheet template. The text expressions themselves, of which there may be many, occupy single cells and are typically hidden from the user's view. End users desiring to view, and possibly alter, these formulas may have to first un-format the spreadsheet to reveal the hidden text expressions, then select each text expression-containing-cell individually for analysis, making it difficult to gather an overall view of the purpose and/or execution of the total spreadsheet report.

In table or grid based applications, a user may not be able to test a specific formula or formulas, represented by a text expression, within a table or grid without first integrating that formula into the report with which they are working. For instance, a user may desire to perform a speculative function on an actual dataset within a spreadsheet without actually making changes to the spreadsheet itself. In current approaches, however, the only place to write a formula, and/or incorporate data into newly written formulas, is in the spreadsheet of which they are a component; there may be no test or trial capabilities outside of making changes to the spreadsheet. This may result in unwantedly affecting other data within a spreadsheet or series of interrelated spreadsheets, before it is determined whether the formula or formulas in question preform the desired function. Furthermore, drafting formulas to interact with data in a spreadsheet may become particularly prolonged for users in text based approaches given the length of some especially complex operations. Revision or iteration processes can therefore be unreasonably time-consuming and labor intensive.

Text-based expressions may additionally present challenges with spreadsheet version control. Comparing current report templates to previous versions to note or comment on changes currently requires users to compare strings of coded text for possibly very diminutive differences. For example, a given formula in a report, such as a financial report, may comprise perhaps 200 characters and 5 nested functions demarcated by parentheses. The nested functions may be local to a single spreadsheet, or may connect to one or more additional spreadsheets and/or databases; that formula may occur in multiple cells of a spreadsheet with the only difference among them being a single operator, an addition versus a subtraction symbol, for example. Users may need to read and interpret first that a difference in operators occurs in each of the seemingly identical formulas, then they may need to determine where within those formulae the difference occurs among the possibly multiple operators each contains. Moreover, there may be many formulas within a given spreadsheet, and version-comparisons between spreadsheets in such approaches require each component in each formula to be cross-referenced with its counterpart in a different spreadsheet.

Additionally, there is currently no standardized way to share particular formulas outside of a spreadsheet. Mathematical relationships intended for distribution to many users for use within a cell or cells of a spreadsheet, may only be copied manually from the individual cell by a single user, then communicated through various means, such as email, text message, and/or by hand, to another user for use in the same or different spreadsheets. In other words, while an entire spreadsheet or spreadsheet template can be saved, along with all formulas it contains, there is no standardized provision allowing users to share particular formulas outside of spreadsheets in a similar way. This lack of efficient and effective distribution carries several risks, including but not limited to mistakes in transcription, various disparities in formatting between users' applications resulting in a lack of uniformity or continuity, and translation errors by the receiving user of the copied formula.

Grid or table-based computer applications or displays allow for the processing and presentation of information. However, creating, accessing and manipulating the text expressions required to execute functions in one or more cells of grid or table-based computer applications is cumbersome and error prone. Embedding parenthetically separated components of a complex argument within the larger text expression of the overall argument and separating different equations in the larger text expression only by commas forces users to read mathematical formulas or arguments in a non-intuitive and convoluted linguistic syntax. There is therefore a need for improved systems and methods of manipulating text expressions within spreadsheets and other grid based applications.

Provided herein are methods and systems having an intuitive user interface for creating, accessing and manipulating text expressions required to execute functions in one or more cells of computer based grid or table-based applications. More particularly, provided herein are methods and systems for converting and manipulating text expressions in a grid or table-based computer application using visual programming.

The contents of cells of a grid or table-based computer application may be created and/or manipulated using a graphical user interface comprising one or more 2D configurations comprising one or more 2D elements. Text expressions may be parsed into one or more syntactic elements, that is, the smallest unit which retains an interpretable meaning. Each syntactic element may be mapped to a 2D element and displayed on a display subsystem. Groups of 2D elements representing portions of a text expression may be arranged to form a 2D configuration representing the entire text expression and the relationships between the various text expressions. In one aspect, 2D elements visually representing mathematical functions, mathematical operations, and/or logical operations (such as comparisons, conditionals, etc.), may calculate and display a result of the function/operation/comparison, thereby enabling a user to determine if a 2D configuration of 2D elements produces the desired result, before mapping the 2D configuration to a text expression, and incorporating the text expression into a spreadsheet. In other aspects, 2D elements or 2D configurations may be mapped to text expressions in a grid or table-based computer application. Components of a text expression may be searched for in a grid or table-based computer application using portions of the text expression and/or the 2D element or configuration representing the desired element of the text expression. In some examples, syntactic elements of text expressions may be mapped to 2D elements and/or configurations and the corresponding shape is searched. In other aspects, a 2D element or configuration may be mapped to a syntactic element of a text expression and the text expression is searched.

According to embodiments of the current disclosure, 2D elements and/or 2D configurations may comprise geometric shapes, curved shapes, shapes comprising a combination of flat and curved edges, and/or combinations of multiple shapes, which may appear flat (that is, may appear two dimensional) or may appear as having depth (that, is may appear as three dimensional, such as may be accomplished by conventional techniques of perspective, shading, color, etc.). Further, it will be understood that use of the terms 2D element and 2D configuration does not preclude use of 3-dimensional rendering/visualization of text expressions, and it will be recognized that the current disclosure provides for 3D elements and 3D configurations which may be graphically displayed via a two-dimensional screen or other display device. The shape, color, and other graphical attributes of a 2D element may be based on the syntactic element to which the 2D element corresponds. For example, mathematical operators may comprise a first shape, and a first color, thereby making 2D elements which correspond to mathematical operators easily visually identifiable and distinguishable from one or more other categories of 2D elements. All or part of a 2D element may change shape, color, texture, etc. based on positional relationship to one or more additional 2D elements, which may provide a visual indication that a first 2D element is interacting with a second 2D element in a pre-determined manner. Further, such positionally dependent shape/attribute changes may provide useful feedback to the user, enabling a better user experience and more intuitive understanding of the interrelationships between 2D elements in a 2D configuration.

A syntactic element of a text expression may comprise an argument (such as a data element) nested by parentheses within a mathematical/logical expression, where the mathematical/logical expression may be further nested in one or more additional expressions. Thus, a first syntactic element of a text expression may be mathematically/logically related to a second syntactic element via a syntactic relationship. In one aspect, by mapping the first syntactic element to a first 2D element, a user may more easily visually process the identity of the first syntactic element, and its syntactic relationship(s) to one or more additional syntactic elements. In some aspects, the syntactic relationship between at least the first and a second syntactic element may be graphically depicted as a spatial relationship between a first and a second 2D element.

By mapping the argument to a first 2D element, wherein the first 2D element may be positioned relative to one or more additional 2D elements representing the additional syntactic elements within which the argument is nested, a syntactic relationship between the argument and the mathematical/logical expressions may be displayed as a 2D configuration. In this way, a text expression within a cell of a spreadsheet may be more clearly visualized, thereby providing a more user friendly method for visual inspection/ error checking of mathematical formulae and/or other information expressed as a text expression, which are conventionally input into spreadsheet cells. Further, the 2D elements and/or 2D configurations may be manipulated using the graphical user interface and the updated rearrangement may be imported back into the spreadsheet, updating the text expression in the spreadsheet to reflect the new arrangement of the 2D elements and/or configurations.

In another aspect, 2D expressions may be mapped to a text expression in a grid or table-based application. For example, a first and second 2D element in a graphical user interface may be selected. The first 2D element may be positioned relative to the second 2D element to form a first 2D configuration of the first 2D element and the second 2D element. One or more cells in a spreadsheet may be selected and the 2D configuration may be mapped to a text expression which is then exported to the one or more selected spreadsheet cells. In this way, a more user friendly method for generating and inputting formulae and/or other text expressions into a spreadsheet cell is provided. Mapping and conversion of text expressions and 2D elements and expressions may occur locally, or may enable a user to generate a mathematical/logical relationship using 2D elements on a first computing system, and export the mathematical/logical relationship to one or more additional computing systems communicatively coupled to the first computing system.

A user may produce a mathematical expression for use in a grid based software application without possessing extensive knowledge of spreadsheet expression syntax by selecting 2D elements representing syntactic elements as two-dimensional shapes, and by assembling the 2D elements into a 2D configuration which represents, in a two-dimensional space, the desired syntactic relationship(s) between the selected syntactic elements. In a more specific example, a user may select a first 2D element representing "2", a second 2D element representing "+", and a third 2D element representing "3", and may arrange the first, second, and third 2D elements relative to one another to indicate that the "+" operator acts on both the "2" and the "3", thereby generating a 2D configuration representing, and mathematically equivalent to, the text expression "2+3". In this way, even inexpert users of grid based software applications may generate complex mathematical relationships/formulae/functions and/or logical expressions for use in spreadsheets or other grid based software applications.

The methods and systems described herein may additionally allow for searching and identification of one or more syntactic elements or text expressions in a grid based application. Searching may occur using syntactic elements, text expressions, 2D elements, and or 2D configurations. For example, a first 2D configuration comprising one or more 2D elements, wherein the 2D elements correspond to syntactic elements of a mathematical expression, may be selected. The 2D configuration may be mapped to a text expression and one or more cells in a spreadsheet may be searched using the text expression represented by the 2D configuration. Cells containing the text expression may be highlighted or display other visual indicators that they contain all or part of the expression of interest. In other examples, a region of spreadsheet cells may be selected and mapped to 2D configurations. The 2D configuration of interest may be selected and the 2D configurations from the region of spreadsheet cells may be searched for 2D configurations that match the selected 2D configuration. Matching 2D configurations may be highlighted or otherwise tagged with a visual indicator.

As a more specific example, a user may select a 2D configuration representing a logical IF THEN statement, and search for each instance of logical IF THEN statements in a selected region of a spreadsheet. Cells in the spreadsheet or other 2D configurations in the graphical user interface that match the selected 2D configuration may be highlighted or otherwise altered to visually indicate the presence of the expression of interest. In addition to providing a user a convenient way to search for instances of text expressions, the above method may further enable more accurate searches for instances of expressions comprising multiple sub expressions, and/or multi-nested expressions.

This approach may provide users a method of searching the entire spreadsheet for any and all references to a particular data interaction in use within the spreadsheet. Users may select an interaction represented by one or more 2D elements from the menu of the graphical user interface (GUI) connected to the spreadsheet and request all instances of that interaction to be found, visually indicated, and displayed as 2D configurations in the GUI. This may be applicable to all interactions with data, such that alterations of those interactions, or corrections to mistaken interactions, may be rapidly located, with the assurance of locating every instance of a particular searched item. Upon location of an interaction, a user may be provided means of altering the interaction within the GUI and applying that change to its every instance in the spreadsheet.

In another aspect, 2D elements visually representing functions, operations, logical comparisons, and other mathematical/logical procedures producing an output, which may compute one or more results based on one or more inputs, may visually display the one or more results within the 2D element, thereby enabling a user to quickly and easily determine the output of a function or other operation which may take a plurality of arguments and produce one or more outputs. In one example, a 2D element corresponding to a summation function, may display the mathematical result of the summation of the one or more arguments the summation function receives, where the arguments may comprise data contained in spreadsheet cells, data entered directly into the summation function by the user, or the output of one or more additional 2D elements, thereby enabling a user to quickly determine the result of the summation function before it is incorporated into a spreadsheet, which may reduce a probability of incorporating an incorrect calculation into a spreadsheet, where the error may be more difficult to find. As another example, a 2D element corresponding to a logical IF/THEN/ELSE statement (such as may be entered as a text expression into a cell of a spreadsheet), which may take at least a first action based on a first condition being met, or may take a second action based on a second condition being met (where the second condition may comprise the first condition not being met), and the action to be taken based on the logical comparison may be displayed within the 2D element, such that a user may quickly determine which of the conditions was met, and what the output/action of the IF/THEN/ELSE expression may be. It will be appreciated, that each 2D element of a 2D configuration comprising a plurality of 2D elements may individually display output. As an example, in a 2D configuration comprising a first function, represented by a first 2D element, nested within a second function represented by a second 2D element, the output of the first function/2D element may be displayed within the first 2D element, and the output of the second function/2D element may be likewise displayed within the second 2D element, thereby enabling a user to determine if the output of both the first and second function are as expected, or if a deviation from expectation has occurred. In another example, a first 2D element corresponding to a multiplication operator may receive a first and a second argument (to perform multiplication on), where the first argument is a second 2D element corresponding to a first summation of a first plurality of values, and the second argument is a third 2D element corresponding to second summation of a second plurality of values, where the result of the first summation is displayed within the second 2D element, the result of second summation is displayed within the third 2D element, and where the result of the multiplication operation of the first and second summations is displayed within the first 2D element, such that the result/output of each 2D element may be easily seen, which may enable more rapid identification of errors, as instead of a single output for a text expression (as is the case with spreadsheets) a plurality of outputs may be calculated and displayed for a single 2D configuration graphically representing a single conventional text expression.

The computer based grid or table-based applications and the graphical user interface may be part of a system comprising one or more computing devices. Such devices may be stand-alone units or may be connected via a network to one or more additional computing devices in the same or different locations. Computing devices may comprise one or more of a logic subsystem; a display subsystem; a communication subsystem; a user input device; and non-transitory memory. In at least one of the computing devices, the non-transitory memory comprises instructions that when executed by the logic subsystem cause the logic subsystem to: select one or more spreadsheet cells based on input from the user input device, wherein the one or more spreadsheet cells comprise a first text expression, and wherein the spreadsheet cells are within a spreadsheet stored in the non-transitory memory of the first computing system; convert the first text expressions into a first 2D configuration, wherein the first 2D configuration comprises one or more 2D elements; and display the first 2D configuration via a graphical user interface on the display subsystem. In this way, a user may more easily and accurately visualize mathematical expressions, formulae, and other types of text expressions entered into a spreadsheet, thereby enabling increased comprehension, error catching, and modification speed/accuracy, of text expressions in a spreadsheet context.

The above methods may enable component parts of a formula or other text expression (herein also referred to as syntactic elements) to become highly visually distinguishable. By depicting formulas visually as 2D configurations, users may more clearly and quickly troubleshoot problems or mistakes with formulas or within individual operations of the formula. As an example, a single incorrectly entered character in a text expression may result in an erroneous computation, which may be difficult to identify, as a single erroneous character may be difficult to find within a text expression displayed within a spreadsheet cell, however, if the text expression were rendered graphically as a 2D configuration, the incorrectly entered character may be easier to identify, as a 2D element, or a position of one or more 2D elements may be altered by incorporation of the typo, making error correction and identification less difficult.

A text expression, as used herein, will be understood to comprise any mathematical and/or logical relationship, or relationships, or data, which may be expressed using text characters, and entered into a cell of a spreadsheet or other grid based software application. Text expression comprises one or more syntactic elements (discussed in more detail below). Thus, all formulas, logical statements (e.g. IF THEN, IF THEN ELSE, WHILE, FOR, DO WHILE, etc.), functions, strings, and numerical data of any type may be herein referred to as a text expression. Text, as used herein, may refer to any character, or series of characters, and will be understood to comprise any number, symbol or letter, and is not limited to alphabetic characters, or alphanumeric characters.

The contents of cells of a grid or table-based computer application may be created and/or manipulated using a graphical user interface comprising one or more 2D configurations comprising one or more 2D elements. Text expressions may be parsed into one or more syntactic elements, that is, the smallest unit which retains an interpretable meaning. Each syntactic element may be mapped to a 2D element and displayed on a display subsystem. Groups of 2D elements representing portions of a text expression may be arranged to form a 2D configuration representing the entire text expression and the relationships between the various text expressions. In one aspect, 2D elements visually representing mathematical functions, mathematical operations, and/or logical operations (such as comparisons, conditionals, etc.), may calculate and display a result of the function/operation/comparison, thereby enabling a user to determine if a 2D configuration of 2D elements produces the desired result, before mapping the 2D configuration to a text expression, and incorporating the text expression into a spreadsheet. In other aspects, 2D elements or 2D configurations may be mapped to text expressions in a grid or table-based computer application. Components of a text expression may be searched for in a grid or table-based computer application using portions of the text expression and/or the 2D element or configuration representing the desired element of the text expression. In some examples, syntactic elements of text expressions may be mapped to 2D elements and/or configurations and the corresponding shape is searched. In other aspects, a 2D element or configuration may be mapped to a syntactic element of a text expression and the text expression is searched.

According to embodiments of the current disclosure, 2D elements and/or 2D configurations may comprise geometric shapes, curved shapes, shapes comprising a combination of flat and curved edges, and/or combinations of multiple shapes, which may appear flat (that is, may appear two dimensional) or may appear as having depth (that, is may appear as three dimensional, such as may be accomplished by conventional techniques of perspective, shading, color, etc.). Further, it will be understood that use of the terms 2D element and 2D configuration does not preclude use of 3-dimensional rendering/visualization of text expressions, and it will be recognized that the current disclosure provides for 3D elements and 3D configurations which may be graphically displayed via a two-dimensional screen or other display device. The shape, color, and other graphical attributes of a 2D element may be based on the syntactic element to which the 2D element corresponds. For example, mathematical operators may comprise a first shape, and a first color, thereby making 2D elements which correspond to mathematical operators easily visually identifiable and distinguishable from one or more other categories of 2D elements. All or part of a 2D element may change shape, color, texture, etc. based on positional relationship to one or more additional 2D elements, which may provide a visual indication that a first 2D element is interacting with a second 2D element in a pre-determined manner. Further, such positionally dependent shape changes may provide useful feedback to the user, enabling a better user experience and more intuitive understanding of the interrelationships between 2D elements in a 2D configuration.

A syntactic element of a text expression may comprise an argument (such as a data element) nested by parentheses within a mathematical/logical expression, where the mathematical/logical expression may be further nested in one or more additional expressions. Thus, a first syntactic element of a text expression may be mathematically/logically related to a second syntactic element via a syntactic relationship. In one aspect, by mapping the first syntactic element to a first 2D element, a user may more easily visually process the identity of the first syntactic element, and its syntactic relationship(s) to one or more additional syntactic elements. In some aspects, the syntactic relationship between at least the first and a second syntactic element may be graphically depicted as a spatial relationship between a first and a second 2D element.

By mapping the argument to a first 2D element, wherein the first 2D element may be positioned relative to one or more additional 2D elements representing the additional syntactic elements within which the argument is nested, a syntactic relationship between the argument and the mathematical/logical expressions may be displayed as a 2D configuration. In this way, a text expression within a cell of a spreadsheet may be more clearly visualized, thereby providing a more user friendly method for visual inspection/ error checking of mathematical formulae and/or other information expressed as a text expression, which are conventionally input into spreadsheet cells. Further, the 2D elements and/or 2D configurations may be manipulated using the graphical user interface and the updated rearrangement may be imported back into the spreadsheet, updating the text expression in the spreadsheet to reflect the new arrangement of the 2D elements and/or configurations.

In another aspect, 2D expressions may be mapped to a text expression in a grid or table-based application. For example, a first and second 2D element in a graphical user interface may be selected. The first 2D element may be positioned relative to the second 2D element to form a first 2D configuration of the first 2D element and the second 2D element. One or more cells in a spreadsheet may be selected and the 2D configuration may be mapped to a text expression which is then exported to the one or more selected spreadsheet cells. In this way, a more user friendly method for generating and inputting formulae and/or other text expressions into a spreadsheet cell is provided. Mapping and conversion of text expressions and 2D elements and expressions may occur locally, or may enable a user to generate a mathematical/logical relationship using 2D elements on a first computing system, and export the mathematical/logical relationship to one or more additional computing systems communicatively coupled to the first computing system.

A user may produce a mathematical expression for use in a grid based software application without possessing extensive knowledge of spreadsheet expression syntax by selecting 2D elements representing syntactic elements as two-dimensional shapes, and by assembling the 2D elements into a 2D configuration which represents, in a two-dimensional space, the desired syntactic relationship(s) between the selected syntactic elements. In a more specific example, a user may select a first 2D element representing "2", a second 2D element representing "+", and a third 2D element representing "3", and may arrange the first, second, and third 2D elements relative to one another to indicate that the "+" operator acts on both the "2" and the "3", thereby generating a 2D configuration representing, and mathematically equivalent to, the text expression "2+3". In this way, even inexpert users of grid based software applications may generate complex mathematical relationships/formulae/functions and/or logical expressions for use in spreadsheets or other grid based software applications.

The methods and systems described herein may additionally allow for searching and identification of one or more syntactic elements or text expressions in a grid based application. Searching may occur using syntactic elements, text expressions, 2D elements, and or 2D configurations. For example, a first 2D configuration comprising one or more 2D elements, wherein the 2D elements correspond to syntactic elements of a mathematical expression, may be selected. The 2D configuration may be mapped to a text expression and one or more cells in a spreadsheet may be searched using the text expression represented by the 2D configuration. Cells containing the text expression may be highlighted or display other visual indicators that they contain all or part of the expression of interest. In other examples, a region of spreadsheet cells may be selected and mapped to 2D configurations. The 2D configuration of interest may be selected and the 2D configurations from the region of spreadsheet cells may be searched for 2D configurations that match the selected 2D configuration. Matching 2D configurations may be highlighted or otherwise tagged with a visual indicator.

As a more specific example, a user may select a 2D configuration representing a logical IF THEN statement, and search for each instance of logical IF THEN statements in a selected region of a spreadsheet. Cells in the spreadsheet or other 2D configurations in the graphical user interface that match the selected 2D configuration may be highlighted or otherwise altered to visually indicate the presence of the expression of interest. In addition to providing a user a convenient way to search for instances of text expressions, the above method may further enable more accurate searches for instances of expressions comprising multiple sub expressions, and/or multi-nested expressions.

This approach may provide users a method of searching the entire spreadsheet for any and all references to a particular data interaction in use within the spreadsheet. Users may select an interaction represented by one or more 2D elements from the menu of the graphical user interface (GUI) connected to the spreadsheet and request all instances of that interaction to be found, visually indicated, and displayed as 2D configurations in the GUI. This may be applicable to all interactions with data, such that alterations of those interactions, or corrections to mistaken interactions, may be rapidly located, with the assurance of locating every instance of a particular searched item. Upon location of an interaction, a user may be provided means of altering the interaction within the GUI and applying that change to its every instance in the spreadsheet.

In another aspect, 2D elements visually representing functions, operations, logical comparisons, and other mathematical/logical procedures producing an output, which may compute one or more results based on one or more inputs, may visually display the one or more results within the 2D element, thereby enabling a user to quickly and easily determine the output of a function or other operation which may take a plurality of arguments and produce one or more outputs. In one example, a 2D element corresponding to a summation function, may display the mathematical result of the summation of the one or more arguments the summation function receives, where the arguments may comprise data contained in spreadsheet cells, data entered directly into the summation function by the user, or the output of one or more additional 2D elements, thereby enabling a user to quickly determine the result of the summation function before it is incorporated into a spreadsheet, which may reduce a probability of incorporating an incorrect calculation into a spreadsheet, where the error may be more difficult to find. As another example, a 2D element corresponding to a logical IF/THEN/ELSE statement (such as may be entered as a text expression into a cell of a spreadsheet), which may take at least a first action based on a first condition being met, or may take a second action based on a second condition being met (where the second condition may comprise the first condition not being met), and the action to be taken based on the logical comparison may be displayed within the 2D element, such that a user may quickly determine which of the conditions was met, and what the output/action of the IF/THEN/ELSE expression may be. It will be appreciated that each 2D element of a 2D configuration comprising a plurality of 2D elements may individually display output. As an example, in a 2D configuration comprising a first function, represented by a first 2D element, nested within a second function represented by a second 2D element, the output of the first function/2D element may be displayed within the first 2D element, and the output of the second function/2D element may be likewise displayed within the second 2D element, thereby enabling a user to determine if the output of both the first and second function are as expected, or if a deviation from expectation has occurred. In another example, a first 2D element corresponding to a multiplication operator may receive a first and a second argument (to perform multiplication on), where the first argument is a second 2D element corresponding to a first summation of a first plurality of values, and the second argument is a third 2D element corresponding to second summation of a second plurality of values, where the result of the first summation is displayed within the second 2D element, the result of second summation is displayed within the third 2D element, and where the result of the multiplication operation of the first and second summations is displayed within the first 2D element, such that the result/output of each 2D element may be easily seen, which may enable more rapid identification of errors, as instead of a single output for a text expression (as is the case with spreadsheets) a plurality of outputs may be calculated and displayed for a single 2D configuration graphically representing a single conventional text expression.

The computer based grid or table-based applications and the graphical user interface may be part of a system comprising one or more computing devices. Such devices may be stand-alone units or may be connected via a network to one or more additional computing devices in the same or different locations. Computing devices may comprise one or more of a logic subsystem; a display subsystem; a communication subsystem; a user input device; and non-transitory memory. In at least one of the computing devices, the non-transitory memory comprises instructions that when executed by the logic subsystem cause the logic subsystem to: select one or more spreadsheet cells based on input from the user input device, wherein the one or more spreadsheet cells comprise a first text expression, and wherein the spreadsheet cells are within a spreadsheet stored in the non-transitory memory of the first computing system; convert the first text expressions into a first 2D configuration, wherein the first 2D configuration comprises one or more 2D elements; and display the first 2D configuration via a graphical user interface on the display subsystem. In this way, a user may more easily and accurately visualize mathematical expressions, formulae, and other types of text expressions entered into a spreadsheet, thereby enabling increased comprehension, error catching, and modification speed/accuracy, of text expressions in a spreadsheet context.

The above methods may enable component parts of a formula or other text expression (herein also referred to as syntactic elements) to become highly visually distinguishable. By depicting formulas visually as 2D configurations, users may more clearly and quickly troubleshoot problems or mistakes with formulas or within individual operations of the formula. As an example, a single incorrectly entered character in a text expression may result in an erroneous computation, which may be difficult to identify, as a single erroneous character may be difficult to find within a text expression displayed within a spreadsheet cell, however, if the text expression were rendered graphically as a 2D configuration, the incorrectly entered character may be easier to identify, as a 2D element, or a position of one or more 2D elements may be altered by incorporation of the typo, making error correction and identification less difficult.

As used herein, a syntactic element will be understood to comprise any unit of text which may alone comprise an interpretable meaning, especially as interpreted in the context of spreadsheet formulae. Each syntactic element may be uniquely mapped to a 2D element, wherein the 2D element graphically represents the syntactic element. 2D elements may graphically represent/correspond to values, operators, functions, logical operations/comparisons (inequalities, IF/THEN/ELSE statements, switch statements, etc.), arguments, key words, etc. As a specific example, in the text expression "2–5", the "2", the "–", and the "5" comprise syntactic elements, while the syntactic relationships, indicated by the position of each syntactic element within the text expression, comprise the way the 2 relates to the 5 via the minus (–) operator. Thus, in the preceding example, the 2, the –, and the 5, may each be mapped to a 2D element graphically representing the 2, the –, and the 5. The three 2D elements may be arranged relative to one another based on the syntactic relationships between each element in the original text expression to form a 2D configuration.

In one example, a binary operator, such as a "+", (which comprises a single syntactic element) may map to a single 2D element, such as a shape having a first and second slot, wherein the first and second slot are configured to receive 2D elements corresponding to the first and second arguments of the operator. As a non-limiting example, a 2D element corresponding to a "+" operator may comprise a first slot and a second slot, where a shape of the first and the second slots are geometrically complimentary to a first and a second 2D element corresponding to a first and a second value, where insertion of the first and second 2D elements into the first and second slots, respectively, indicates that the "+" operator is to perform addition of the first and the second values. As a non-limiting example of other syntactic elements, any mathematical operator (e.g. –, +, x, / etc.) may be herein considered a syntactic element of a text expression of a mathematical relationship or other relationship. As another example, a function, such as those functions conventionally known in the art of spreadsheets (e.g. SUM( ), AVERAGE( ), MIN( ), MAX( ) etc.) or functions not conventionally used in spreadsheets, may herein also be referred to as syntactic elements.

As an additional example, a range of cells (which will be understood to encompass any positive, integer, non-zero, number of spreadsheet cells) may hold one or more text expressions, wherein each text expression may comprise one or more syntactic elements. Further, a range of cells may hold data elements, such as those data elements/structures conventional in the art of computer science, which in a non-limiting example may include integers, floating point values, characters, strings, arrays, Boolean values, etc. Data elements may be input into cells as part of a larger text expression, or may be input into a cell without additional syntactic elements. In one example, a cell may hold a data element as part of a larger text expression, such as in "SUM(1,2,4)", where 1, 2, and 4 are data elements in a larger text expression. As another example, a cell may hold a data element without additional syntactic elements, such as "1.00", "False", "3.1415926", etc. A data element contained within a cell may be referenced using the address of the cell. For example, a cell in the $A^{th}$ column and the $12^{th}$ row may hold a data element, wherein the data element is a value, and referencing the address of the cell (A12) may be equivalent to referencing the data element/value stored therein. In one example, 2D elements corresponding to/graphically representing data elements within a cell may be generated based on user input of a cell address corresponding to the data element, or by selection of the cell(s) holding the data element by a user input device (e.g. a mouse, a touchscreen, a motion tracker, etc.). As a further example, a value, such as 1.541, Π, 1, True, False, 'C', "This is a string", etc. may comprise a single syntactic element, and may therefore be mapped to a unique 2D element intuitively representing the value.

The current disclosure may enable users to select and map to 2D elements, each text expression in a spreadsheet, thereby enabling a user to better visualize each mathematical/logical relationship within a spreadsheet. When a user downloads through an internet connection or otherwise acquires a spreadsheet with multiple pre-programmed formulas for data interaction, the approach may provide users an option to locate all text expressions active in the spreadsheet, whether hidden from view or not, and then display those text expressions graphically. This may give users the ability to both scrutinize arguments individually as well as view their relationships with one another and the holistic outcomes they achieve, considerably improving users' understanding and thus the accuracy of their data analysis.

In another aspect of the invention, common functions, operations, comparisons, and/or data inputs may exist as discrete 2D elements in menus within a GUI. For example, a user may select a first 2D element from a pre-populated menu within the GUI, and drag it into a workspace of the GUI. 2D elements may correspond to a function, which may intuitively represent the function as a geometric shape, wherein a color of the shape, a pattern on the shape, or other visual features of the shape may indicate the identity/function of the 2D element. Once a first 2D element is selected, the user may select a second 2D element corresponding to a second function and/or data contained in one or more spreadsheet cells, such that the first 2D element and the second 2D element both occupy the workspace of the GUI. The user may then arrange the position of the first 2D element and the second 2D element relative to each other using a user input device to create a 2D configuration. The 2D configuration generated in this manner may represent a logical/mathematical relationship between the plurality of 2D elements, which may be exported to a spreadsheet cell as a text expression, or exported to one or more computing systems or memory locations independently of a spreadsheet file. In this way a user may generate a text expression from 2D elements selectable from pre-defined menus in a GUI.

Further, the current disclosure may provide clearer, more reliable means of collaboration. By saving user generated 2D configurations to a computing system, where the computing system is communicatively coupled to a computer network (such as the Internet) or to one or more additional computing systems via a local area network, user generated 2D configurations may be efficiently distributed to one or more computing systems, which may further enable a plurality of users to collaborate on a single spreadsheet.

Further, the current disclosure may provide users the ability to test functions to be used in a spreadsheet, data to be used in a function, or both, before fully implementing or incorporating the test data and/or function into the actual spreadsheet. By connecting a spreadsheet to the GUI, which may read the data and interactions within the spreadsheet to which it is connected, this approach may provide a separate place for users to build functions and to test those functions either with real data from the spreadsheet or test-data entered by the user. Thus, users may experiment with data and/or interaction in the GUI without affecting the spreadsheet to which it is linked, and the results can be analyzed before applying the interaction to the actual spreadsheet, reducing both mistakes and revision time. Said another way, the current disclosure may enable a 2D element visually representing one of a function, an operation, a logical comparison, and/or other mathematical/logical procedures producing one or more results/outputs, to visually display the one or more results/outputs within the 2D element, thereby enabling a user to quickly and easily determine the output of the function/operation/comparison/procedure before applying it to a spreadsheet, or otherwise exporting the function/operation/comparison/procedure. In one example, a 2D element corresponding to an averaging function (AVERAGE( )), may display the mathematical result of averaging the one or more arguments the averaging function receives, where the arguments may comprise data contained in spreadsheet cells, data entered directly into the summation function by the user, or the output of one or more additional 2D elements, thereby enabling a user to quickly determine the result of the averaging function before it is incorporated into a spreadsheet, which may reduce a probability of incorporating an incorrect calculation/function/ operation etc. into a spreadsheet, where the error may be more difficult to find. As another example, a 2D element corresponding to a logical AND statement (such as may be entered as a text expression into a cell of a spreadsheet), which may output true, if both arguments are true, and false, if one or both of the input arguments are false, may receive a first argument comprising a Boolean value of false, and a second argument comprising a Boolean value of true, and based on the first and second argument, may output a result of "False" within the 2D element, such that a user may quickly determine the outcome of the logical conjunction.

It will be appreciated that each 2D element of a 2D configuration comprising a plurality of 2D elements may individually display output. As an example, in a 2D configuration comprising a first function, represented by a first 2D element, nested within a second function represented by a second 2D element, the output of the first function/2D element may be displayed within the first 2D element, and the output of the second function/2D element may be likewise displayed within the second 2D element, thereby enabling a user to determine if the output of both the first and second function are as expected, or if a deviation from expectation has occurred. In another example, a first 2D element corresponding to a multiplication operator may receive a first and a second argument (to perform multiplication on), where the first argument is a second 2D element corresponding to a first summation of a first plurality of values, and the second argument is a third 2D element corresponding to second summation of a second plurality of values, where the result of the first summation is displayed within the second 2D element, the result of the second summation is displayed within the third 2D element, and where the result of the multiplication operation of the first and second summations is displayed within the first 2D element, such that the result/output of each 2D element may be easily seen, which may enable more rapid identification of errors, as instead of a single output for a text expression (as is the case with spreadsheets) a plurality of outputs may be calculated and displayed for a single 2D configuration graphically representing a single conventional text expression.

Further, the current disclosure may provide for 2D elements comprising one or more interactable features, which may provide user guidance. In one example, an input field of a 2D element may comprise a pre-defined menu of user selectable options, thereby constraining input into the input field to a pre-specified range and/or to valid input types (data types). In another example, a 2D element may comprise explanatory text, which may indicate one or more behaviors of the 2D element. As a specific example, a 2D element may comprise a slot/indentation for receiving at least a second 2D element, and responsive to a user selecting the slot/ indentation, text may appear explaining acceptable input types (data types) or other features of the slot/indentation. By providing user guidance in this manner, a reduction in reliance on user knowledge may be enabeled, allowing users without detailed technical knowledge, to nonetheless work with, and generate, technically accurate and functional equations/formulae, etc.

By providing users visually distinct 2D representations of any function within a spreadsheet, even the most complex and analogous functions may look graphically distinct from one another. Because operations, functions, data, and/or comparisons all exist as graphically distinct 2D elements in the GUI, effecting a change of a single element changes the appearance of the 2D configuration representing a text expression. Thus, tracking changes between versions is simplified significantly as comparisons between two or more text expressions in two or more spreadsheets and/or cells may be a matter of comparing disparate shapes and colors, rather than cross-referencing complex strings of text.

In another aspect, distinct portions of complex text expressions within a spreadsheet may be displayed graphically as 2D configurations using the vertical arrangements familiar to most users when interacting with mathematical expressions outside of spreadsheet environments. As an example, the component functions of a text expression may be displayed so that they are visually separated and the relationships between them are clearly indicated by the spatial relationships between the 2D elements comprising the graphical representation of the expression. In this approach, interior portions of a function, otherwise set off by parentheses in a horizontal text expression based method, may be displayed as discrete 2D elements. Therefore, users may be provided more intuitive visual descriptions of the complex, embedded components of data interactions in a spreadsheet, including the entire structure of extremely complicated custom arguments, simplifying the user's construction of data interactions.

Further, by allowing users to assemble arguments of varying degrees of complexity through a visually distinct GUI using 2D elements, this approach may introduce highly reliable means of creating and sharing individual formulas within spreadsheets. Users with the same spreadsheet application, and within the same organization with access to a central data source through the cloud or internet, may be able to upload and download from that central source spreadsheet templates and/or pre-configured sets of interactions for use in spreadsheets using different data configurations, and on different networks. This may mitigate the need to transcribe individual formulas manually for dissemination throughout an organization or sharing community, reducing the possibility for typographical error incorporation and propagation, and creating a reliable, standardized way to share formulas.

Users may use pre-existing 2D elements and configurations or may create their own custom data interactions as individual 2D elements, or 2D configurations of 2D elements, and saving them over an internet connection to a central data source to be stored and/or shared. An equation of any complexity may be assembled as a 2D configuration of one or more 2D elements representing a spreadsheet function. Then, the user may include that function in a menu which can subsequently be accessed by any spreadsheet user connected to the network of the user who created the function. Therefore, this approach provides users the means to more easily and effectively share prebuilt data interactions.

Although described herein as 2D elements and 2D configurations, the 2D elements and/or 2D configurations may comprise geometric shapes, curved shapes, shapes comprising a combination of flat and curved edges, and/or combinations of multiple shapes, which may appear flat (that is, may appear two dimensional) or may appear as having depth (that, is may appear as three dimensional, such as may be accomplished by conventional techniques of perspective, shading, color, etc.). Further, it will be understood that use of the terms 2D element and 2D configuration does not preclude use of 3-dimensional rendering/visualization of text expressions such as holographic renderings or others, but is used to contrast with the substantially 1-dimensional text expressions (that is, meaning of a symbol/character within a text expression is interpreted based on order within the text expression, where order corresponds to a first dimension) conventionally employed in grid based software applications. All or part of a 2D element may change shape based on positional relationship to one or more additional 2D elements, which may provide a visual indication that a first 2D element is interacting with a second 2D element in a pre-determined manner. Further, such positionally dependent shape changes may provide useful feedback to the user, enabling a better user experience and more intuitive understanding of the interrelationship between 2D elements in a 2D configuration. As a specific example, 2D elements may comprise geometrically complimentary/mateable shapes, wherein complimentary geometrical boundaries and/or cavities of 2D elements may interconnect. In one example, a binary operator, such as a "/" operator, may be visualized as a two dimensional shape (2D element), comprising a first and second indentation/cavity, wherein the first and second indentation/cavity corresponds to the two arguments which may be received/operated-on by this operator (the numerator and denominator). The shape of the indentation/cavity may be complimentary to all or part of a shape of a 2D element corresponding to a value, or a spreadsheet cell address, or to an address for a range of spreadsheet cells, such that 2D elements corresponding to values may intuitively mate with 2D elements corresponding to operators, functions, or other syntactic elements which may take one or more values as arguments. Further, a 2D element corresponding to a function, where the function is incompatible with a subset of values, may comprise an indentation/cavity with a geometry which is not complimentary to a geometry of 2D elements corresponding to the subset of values, such that a user may visually intuit that the function may not receive values belonging to the subset of values as arguments.

Turning to the figures, FIG. 1 shows an example computing environment 100 for a grid-based application. For example, computing environment 100 may be used to import data from various data sources in various locations, e.g., local data sources, networked data sources, or cloud-based data sources, into a grid for data management and display.

Computing environment 100 includes a grid server 102 configured to provide instances of grids or tables to a user for managing data. For example grid server 102 may include a grid-based application 104, e.g., a spreadsheet application or the like, configured to provide a grid to a user for data input, data importing, data manipulation, data sharing, data formatting, etc. Grid server 102 may be any suitable computing device configured to provide a grid to a user in any suitable way. For example, grid server 102 may be configured to provide a grid via network 134 to a first client device 128 and to a second client device 124 via network 132. Network 134 and network 132 may be any suitable network, e.g., network 134 may be a local area network or the internet, for example. In one example, first client device 128 and second client device 124 are communicatively coupled to grid server 102 via a single network. First client device 128 may include a browser 130 or other suitable application configured to access grid server 102 and display a grid or table provided by grid server 102 on a display of first client device 128. Similarly, second client device 124 may include a browser 126 or other suitable application configured to access grid server 102 and display a grid or table provided by grid server 102 on a display of client device 124. Although FIG. 1 shows two client devices communicatively coupled to grid server 102, it will be appreciated that grid server 102 may be communicatively coupled with any positive integer number of client devices. For example, grid server 102 may be a company server into which users log-on via terminal computers in order to access grid-based application 104. As another example, grid server 102 may be configured as a web server into which users of personal computers may remotely access grid-based application 104 via the internet. For example, grid-based application 104 may be configured to operate in a cloud computing environment, e.g., the application may be running over a plurality of servers and may be accessible by users of client devices over the internet. The client devices may be personal computing devices or mobile devices, e.g., desktops, cell phones, tablets, laptops, or the like. For example, a user may desire to manage data in a grid or table via the cloud from a variety of different locales or networks.

As another example, a user of grid server 102 may locally access a grid provided by the grid server. For example, a user of grid server 102 may access a grid or table by running a grid-based application, e.g., grid-based application 104, on grid server 102. Thus, the grid-based application 104 may be locally installed on a client computer or may be utilized through a web browser, for example.

In some examples, the grid server 102 and/or grid-based application 104 may include an addin 106 or other suitable plug-in configured to confer additional functionality to grid server 102 and/or grid-based application 104. However, in some examples, additional functionality as described herein may be built directly into the functionality of the grid server or grid-based application. For example, addin 106 may provide the grid server or grid-based application with specialized functions accessible by a user of a grid or table provided by grid server 102 to perform additional tasks within the grid. For example, as described in more detail below herein, the addin 106 or additional functionality may provide various functions for visualizing text expressions as 2D configurations, generate text expressions from user selected and assembled 2D configurations, and/or search a spreadsheet for mathematical/logical relationships expressed as 2D configurations. Addin 106 may be further configured to directly interface with various specified data sources to import, format, and update data in a grid provided by grid server 102. Further, the addin 106 or the additional functionality may provide various authentication options for accessing different data sources with different security requirements and stored procedures and may provide various filtering and display options for control of data presented in a grid. Examples of visualizing text expressions as 2D configurations comprised of 2D elements, with which a user may interact to edit/modify the underlying text expression, are given in more detail with reference to the descriptions of FIGS. 12-15.

Data sources accessible by the grid server may be any suitable sources of data, e.g., databases, web data servers, and proprietary databases associated with programs such as Enterprise Resource Planning (ERP) Systems, Business Intelligence Solutions, Data Warehouses and transactional data systems, for example. In some examples, such data sources may be external to grid server 102 and/or client device 128. For example, a plurality of external data sources 108 including data source 112, 114, and 116 may be accessible to grid server 102 and addin 106 or via network 136, where in some examples, network 136 may comprise a local area network, or the Internet. In some examples, data sources may also be internal to grid server 102 and/or client device 128, e.g., residing in a memory component of grid server 102 or client device 128. By way of example, a plurality of internal data sources 110 including data sources 118, 120, and 122 may be accessible to grid-based application 104 and addin 106.

As described in more detail below, any suitable data source may be accessed by grid server 102 once a path to the data source is specified. A path to a data source may be a network path, URL, or a local path to a data source stored on grid server 102 or client device 128. For example, a data source may be accessed through a path or address to the data source, security settings, and various other protocols associated with the data source. In this way, data may be directly imported into a grid from a variety of different data sources or data servers with different data storage formats and protocols.

Turning to FIG. 2, an example of a conventional spreadsheet 200 is shown. Spreadsheet 200 comprises a plurality of spreadsheet cells, such as spreadsheet cell 204, arranged into a grid pattern. Each spreadsheet cell may receive input of a text expression, such as text expression 202. The text expression(s) may be input via a user input device, and may logically and/or mathematically relate data contained in one or more additional spreadsheet cells. In one example, a text expression may be entered into a first spreadsheet cell of spreadsheet 200, wherein the text expression may comprise a function, where the function receives as input data contained in a second spreadsheet cell (or a range of spreadsheet cells) and the output of the function is displayed in the first spreadsheet cell. As may be readily seen from FIG. 2, reading a text expression entered into a spreadsheet in a conventional manner, which may comprise a linear text expression, may be difficult, and may be more difficult as the text expressions become more complex and contain multiple nested arguments.

Figure 3:
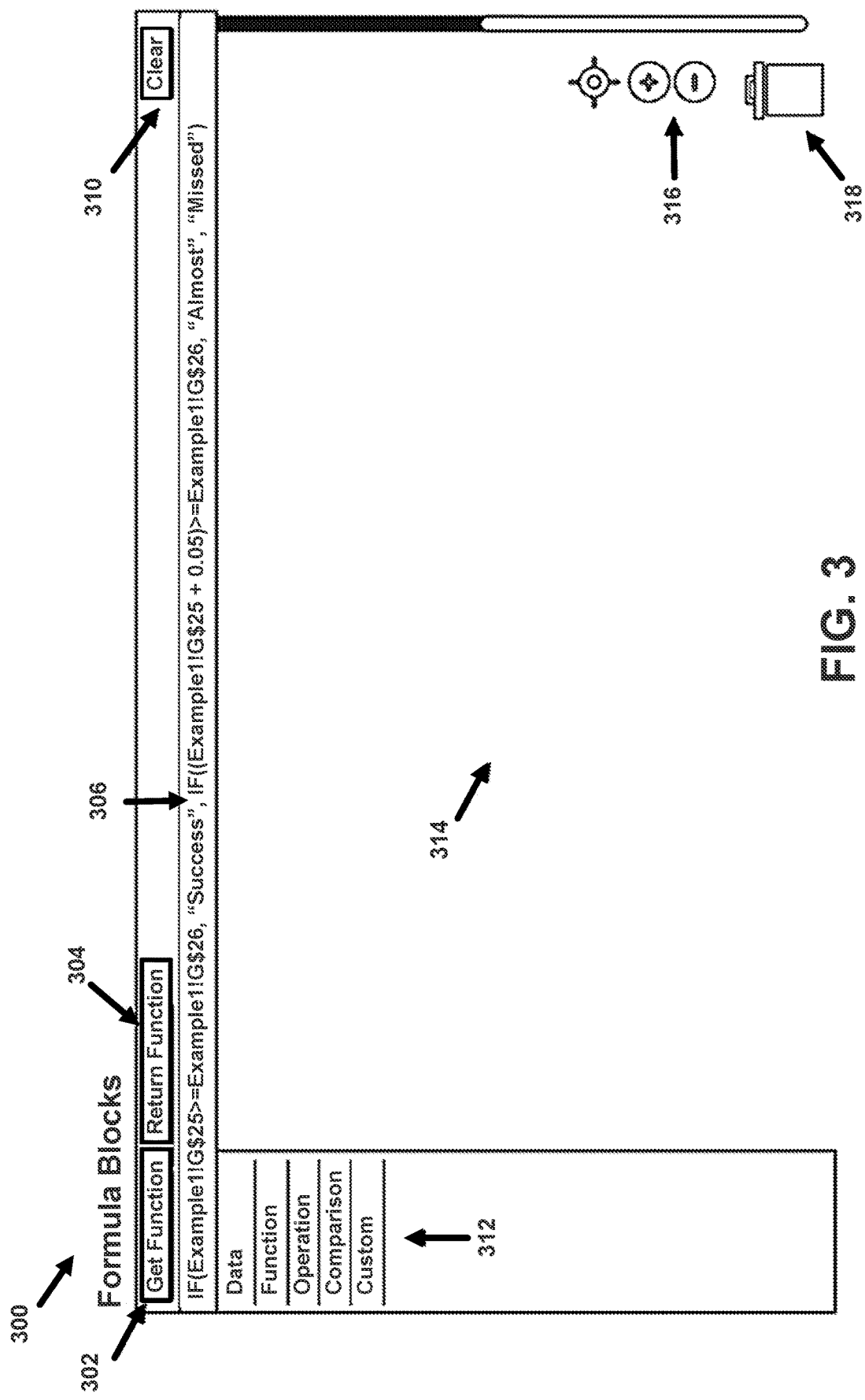
FIGS. 3-11 depict exemplary graphical user interfaces, according to exemplary embodiments of the current disclosure.

Turning to FIG. 3, example graphical user interface (GUI) 300 is shown. GUI 300 provides one example of a graphical user interface which may be used in one more methods disclosed herein to display, generate, and/or modify 2D configurations. GUI 300 comprises a "Get Function" button 302, which may be used to import a text expression from one or more spreadsheet cells into formula window 306, which displays the formula/text expression being worked on. In one example, the "Get Function" button 302 may further initiate conversion of one or more text expressions within the one or more selected spreadsheet cells into a corresponding/equivalent 2D configuration.

Once a text expression is pulled from the spreadsheet into GUI 300, the syntactic elements comprising the text expression may be mapped to 2D elements and displayed in workspace 314 as a 2D configuration. In one example, conversion of text expressions into 2D configurations may comprise parsing the text expression into a plurality of syntactic elements, mapping each syntactic element to a corresponding 2D element, and arranging the 2D elements into a 2D configuration capturing the syntactic relationships between the syntactic elements of the text expression. As a further example, parsing a text expression into one or more syntactic elements may comprise approaches of regular expression identification. As a more specific example, a text expression may be searched for occurrences of predefined meaningful character patterns, where the patterns may not necessarily be continuous (that is, the patterns may be interposed by one or more additional characters). In one example, a meaningful pattern may comprise a function, such as a SUM( )function, where one or more arguments may be placed within the parentheses of the function, such that a regular expression of the form "SUM( . . . )" may be used to search a text expression for occurrences of the function, where the " . . . " may comprise any number of additional arguments or nested functions. Each identified syntactic element may be mapped to a 2D element graphically representing the syntactic element. As one example, a predefined map, such as may be stored as a set of pairs, such as in a dictionary data structure, may map each unique syntactic element to a unique 2D configuration which graphically represents the syntactic element in an intuitive manner. As one example, syntactic elements may be divided into categories, wherein each category comprises similar characteristics, and wherein syntactic elements of a category are mapped to 2D elements comprising one or more features which uniquely identify the 2D element as corresponding to a syntactic element of the category. As a more specific example, each mathematical operator may belong to a first category, each function may belong to a second category, and each data element may belong to a third category, wherein one or more of a color, shape, size, or other visual feature of each 2D element corresponding to the first category may be substantially the same, wherein one or more of a color, shape, size, or other visual feature of each 2D element of the second category may be substantially the same, and wherein one or more of a color, shape, size or other visual feature of each 2D element of the third category may be substantially the same, such that a 2D element may be rapidly visually determined as belonging to the first, second, or third category based on inclusion of one or more visual features.

Workspace 314 may comprise a region within GUI 300 where the current 2D configuration, and the 2D elements comprising the 2D configuration, may be displayed and manipulated via a user input device, such as by dragging a 2D element from a first position to a second position within workspace 314.

In one example, 2D elements may be added to workspace 314 from a library of predefined 2D elements, wherein the library of predefined 2D elements may be categorized and displayed via drop down menus, such as those displayed in drop down menu bar 312. For example, 2D elements may be selected from one or more of the categories displayed in drop down menu bar 312, which in one example comprise the categories of "Data", "Function", "Operation", "Comparison", and "Custom" (these categories are further described below). The view of the currently displayed 2D configuration within workspace 314 may be adjusted by view control panel 316, which may comprise zoom in, zoom out, and origin selection buttons.

Clear button 310 may clear all 2D elements currently occupying workspace 314. In another example, 2D elements may be removed from workspace 314 by dragging the 2D element to the delete icon 318, which in GUI 300 is depicted as a trash bin. GUI 300 further comprises a "Return Function" button 304 which may be used to export a text expression representation of a 2D configuration to one or more selected spreadsheet cells after the 2D configurations of the text expressions have been manipulated as desired. The selected spreadsheet cells may be the same or different spreadsheet cells than the source for the text expression as obtained using the Get function 302.

FIGS. 4-7 are exemplary embodiments of graphical user interfaces which may enable a user to generate 2D configurations representing text expressions using drop down menus displaying pre-defined 2D elements. 2D configurations generated in this manner may be exported to one or more of a spreadsheet (or other grid based software application), another computing system, and/or added to a library of pre-defined 2D configurations.

Figure 4:
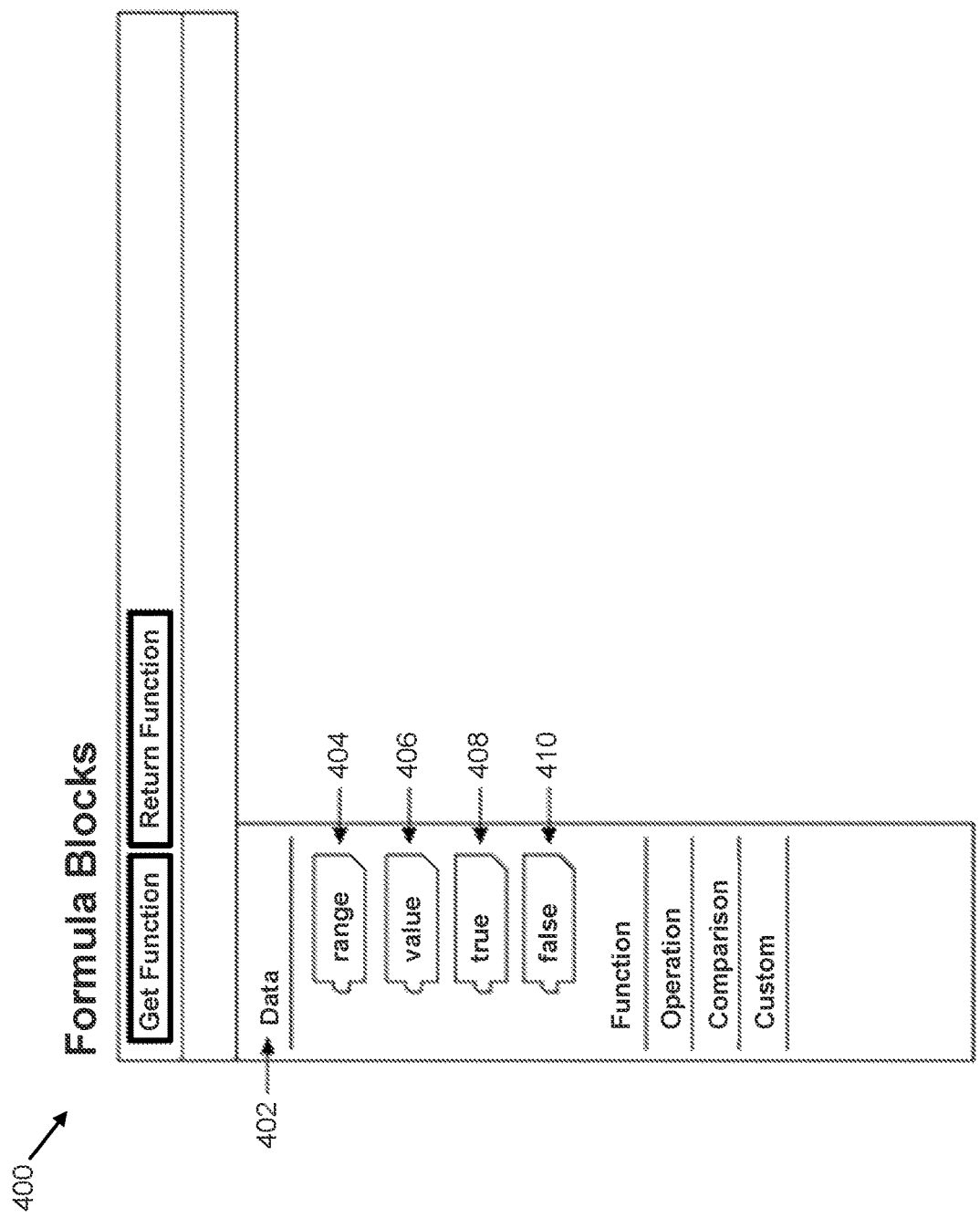

For example, FIG. 4 shows example GUI 400, which emphasizes the "Data" category 402 of 2D elements which may exist as part of a predefined library of 2D elements, and which may be selectable by a user to populate a workspace of GUI 400. "Data" category 402 may comprise one or more 2D elements which may be used to represent data contained in one or more spreadsheet cells. As shown in GUI 400, "Data" category 402 further comprises the 2D elements of Range 404, Value 406, True 408, and False 410. Range 404 may graphically represent data contained in a range of spreadsheet cells, where a range will be understood to comprise one or more spreadsheet cells. In one example, a user may select Range 404 by clicking on Range 404 as shown in GUI 400. The user may subsequently be prompted to indicate a range of spreadsheet cells to be linked/associated with the range, and a 2D element corresponding to the indicated spreadsheet range may populate a workspace. The 2D element may then be used along with one or more additional 2D elements to generate various 2D configurations. Value 406 may comprise a 2D element corresponding to a single, static value, which be entered following user selection of value 406. In another example, upon selecting Value 406 from a drop down menu bar, the user may be prompted to make a selection of a single spreadsheet cell, where data contained within the selected single spreadsheet cell may then be linked with the "value" 2D element generated.

GUI 400 further comprises True 408 and False 410 icons, which may be selected by a user to generate a 2D element corresponding to the Boolean value TRUE and a 2D element corresponding to the Boolean value of FALSE, respectively. The 2D elements which may be selected from the "Data" category 402, may additionally comprise the various data and data structures upon which the other 2D elements may operate, as will be illustrated in more detail below.

Figure 5:
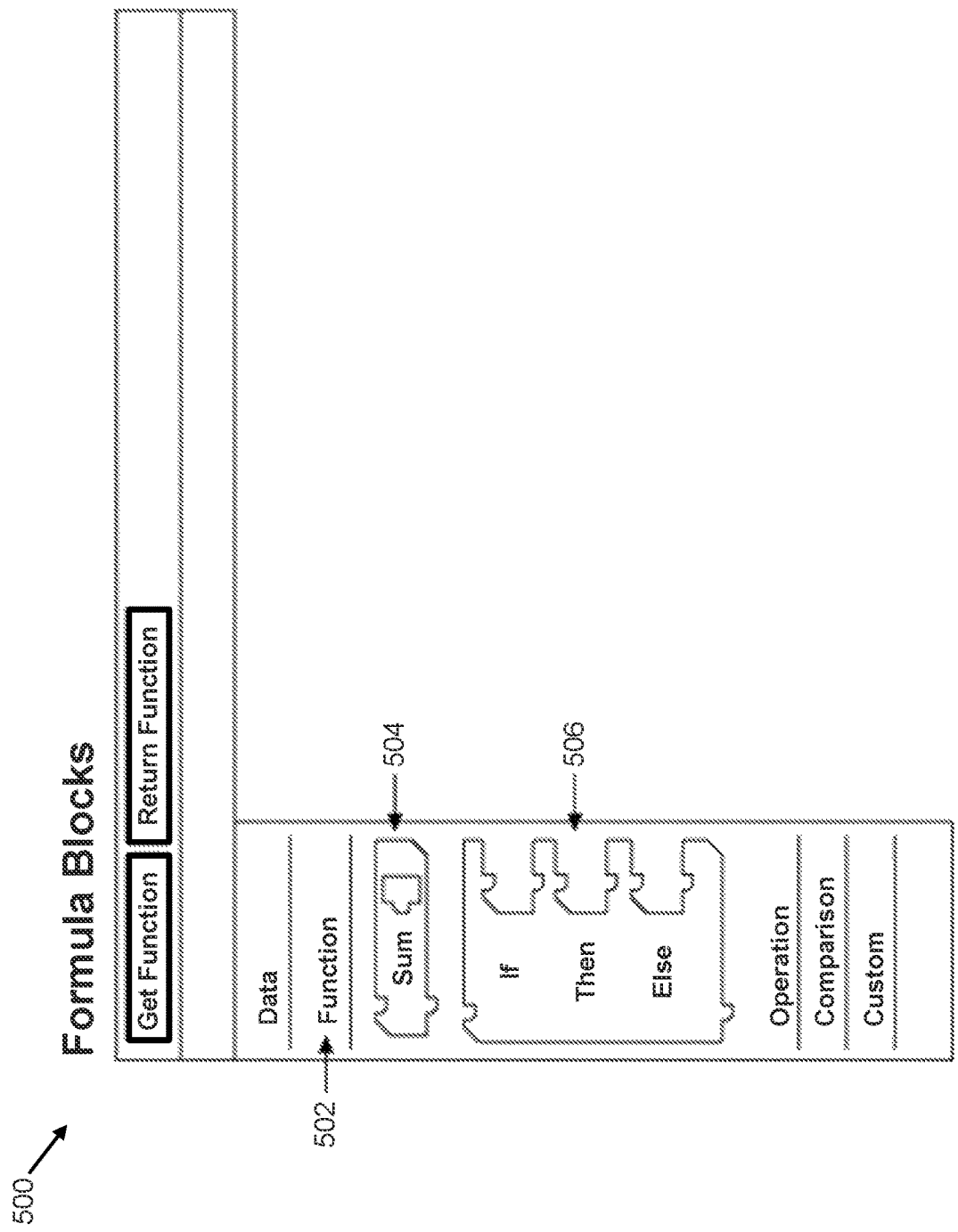

FIG. 5 illustrates example GUI 500, which emphasizes the "Function" category 502, of the predefined 2D elements. As shown in FIG. 5, the "Function" category 502 comprises a "SUM" function 504 and an "IF THEN ELSE" function 506, however, it will be understood that the "Function" category 502 may comprise any number of functions, such as any functions known conventionally in the art of spreadsheets, or other functions known in the art of mathematics. For example, "Function" category 502 may comprise one or more of AVERAGE( ) functions, LOGISTIC( ) functions, MIN( ) functions, MAX( ) functions, COS( ) functions, SIN( ) functions, and any other function known in the art of mathematics. "SUM" function 504 may be selectable by a user, wherein upon selection by a user a 2D element corresponding to a "SUM" function may populate a workspace of GUI 500, thereby enabling a user to position one or more 2D elements corresponding to data (as discussed in reference to FIG. 4 above) into a relationship/configuration with the "SUM" 2D element. Each data 2D element connected with the 2D element corresponding to the "SUM" function may then be taken as an argument by the "SUM" function, and an output sum of the input data may be given in the workspace. In one example, a 2D element corresponding to a function may display within its boundaries the output of said function, even before being exported to the spreadsheet, which may enable a user to evaluate the result of one or more user selected/generated 2D configurations before applying said 2D configuration to the spreadsheet.

Figure 6:
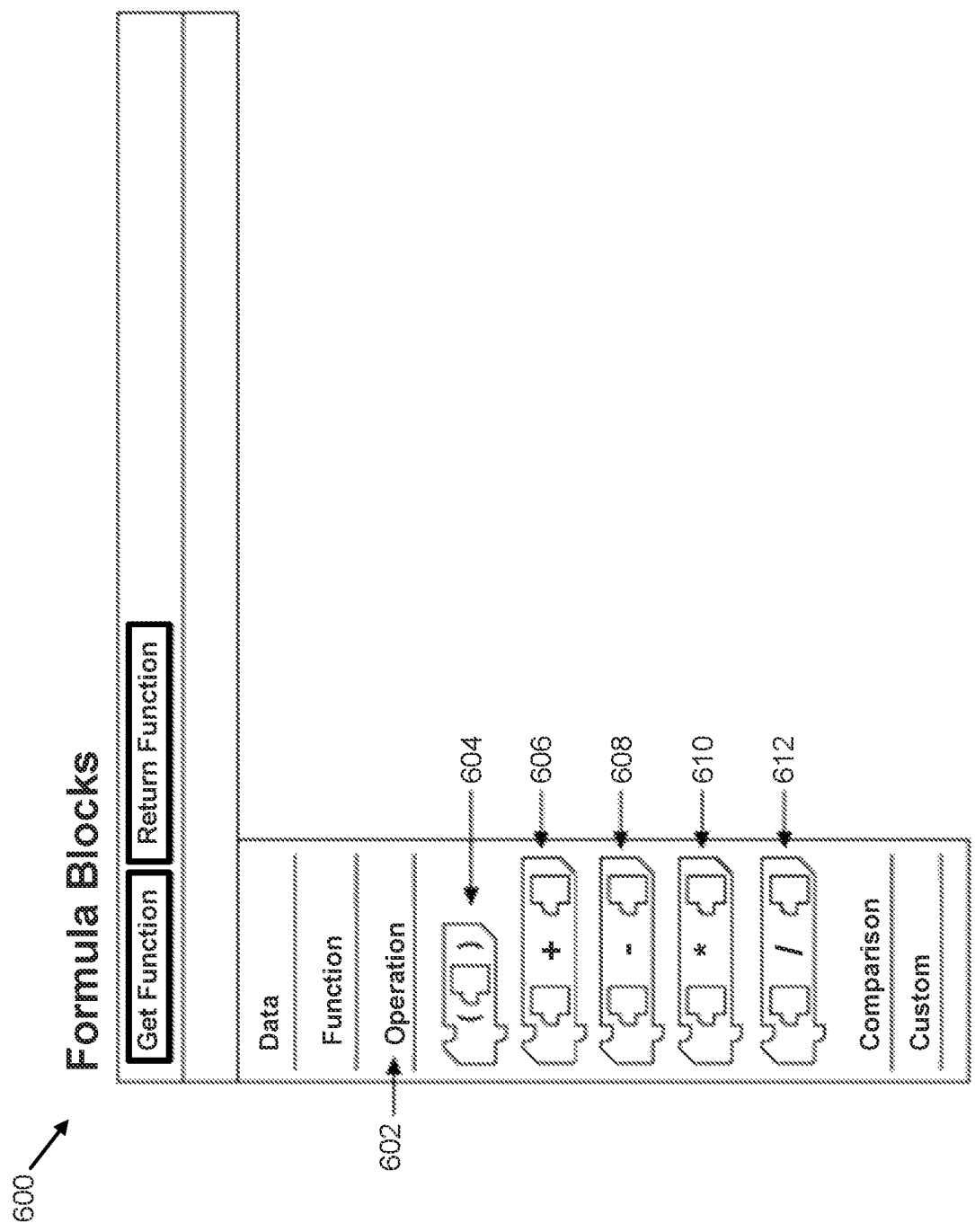

FIG. 6 illustrates example GUI 600, which emphasizes the "Operation" category 602 of 2D elements, where 2D elements in this category may correspond to mathematical operations, such as "+", "−", "*", "/", etc. which may be used to perform the indicated mathematical operations on one or more data elements corresponding to 2D elements from the "Data" category. As shown in FIG. 6, "Operation" category 602 comprises "Parentheses" operator 604, for indicating order of operations, "Plus" operator 606, for calculating a sum of two values indicated by data 2D elements (or combinations of 2D elements), "Minus" operator 608, which may calculate the difference between two values indicated 2D elements, "Multiplication" operator 610, which may calculate the produce of two values indicated by data 2D elements, and "Division" operator 612, which may be used to calculate the quotient of two values. Additional operators may be included in the "Operation" category 602 without departing from the scope of the disclosure, such as ++ operators, −− operators += operators, etc. Each operator may map to a corresponding 2D element which graphically represents the operator. The corresponding 2D element may or may not have a shape which intuitively captures the behavior of the corresponding operating. For example, a binary operator, which takes two arguments, may corresponding to a 2D element having a shape with complimentary geometry to a shape of a first and a second 2D element, wherein the first and second 2D element may correspond to data elements, as described above, or may correspond to the output of a complex combination of one or more data elements, functions, and operators. In one example, a binary operator, such as a "*" operator, may be visualized as a two dimensional shape (2D element), comprising a first and second indentation/cavity, wherein the first and second indentation/cavity corresponds to the two arguments which may be received/operated-on by this operator (the operands). The shape of the indentation/cavity may be complimentary to all or part of a shape of a 2D element corresponding to a value, or a spreadsheet cell address, or to an address for a range of spreadsheet cells, such that 2D elements corresponding to values, or 2D elements which correspond to functions which output compatible values, may intuitively mate with 2D elements corresponding to operators, functions, or other syntactic elements which may take one or more values as arguments. Further, a 2D element corresponding to an operator which is incompatible with a subset of values, may comprise an indentation/cavity with a geometry which is not complimentary to a geometry of 2D elements corresponding to the subset of values, such that a user may visually intuit that the operator may not receive values belonging to the subset of values as arguments.

Figure 7:
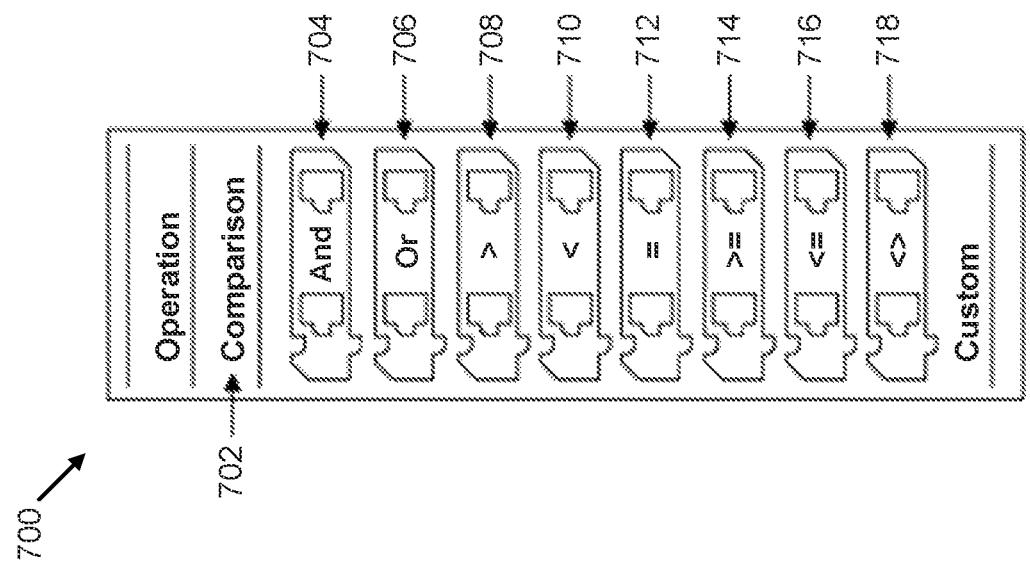

FIG. 7 illustrates GUI 700, which emphasizes the "Comparison" category 702 of 2D elements. As shown in FIG. 7, "Comparison" category 702 comprises a plurality of comparison operators known in the art of mathematics and computer science, however it will be understood that the example shown in FIG. 7 is in no way limiting to the number and types of comparison operators which may be included in "Comparison" category 702. "Comparison" category 702 comprises the logical "AND" operator 704, the logical "OR" operator 706, the "greater than" comparison 708, the "less than" comparison 710, the "equality" comparison 712, the "greater than or equal to" comparison 714, the "less than or equal to" comparison 716, and the "not equal to" comparison 718. In one example, each of the elements shown in "Comparison" category 702 may be selected by a user to populate a workspace with 2D elements corresponding to the indicated/selected comparison. The arguments of the comparisons may be data elements, represented by 2D elements, or complex arrangements of a plurality of 2D elements. In one example, a 2D element corresponding to a "greater than" comparison may be selected by a user, and upon selection a 2D element corresponding to a "greater than" comparison may populate a workspace of GUI 700. The shape of the 2D element corresponding to the "greater than" comparison may comprise a first and a second indentation or cavity, which may receive one or more additional 2D elements, wherein a position of the indentations/cavities intuitively indicates that 2D elements (or assemblages of 2D elements) entered into the first indentation/cavity will be numerically compared with the 2D element (or assemblage of 2D elements) entered into the second indentation/cavity.

Figure 8A:
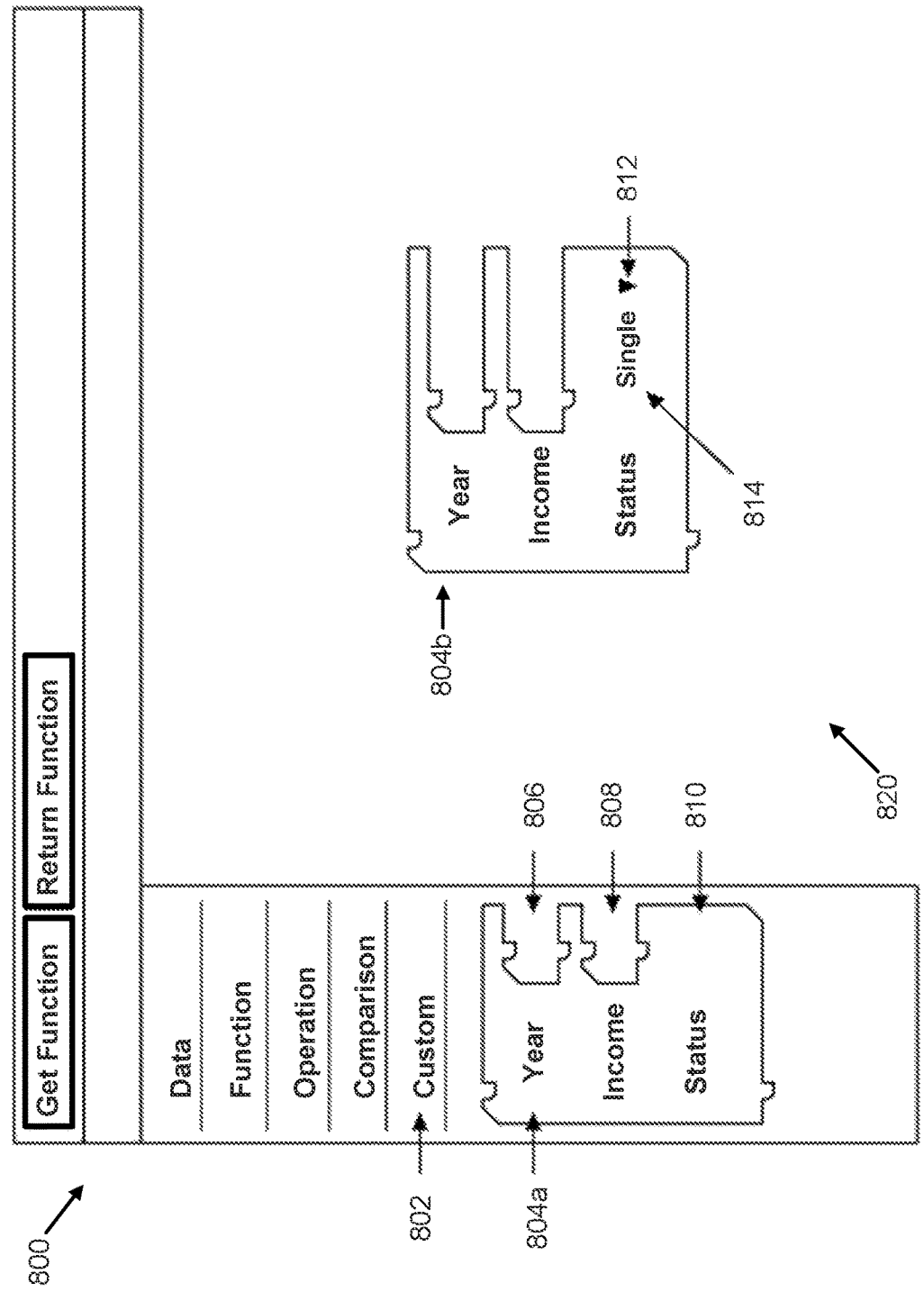

FIG. 8A illustrates GUI 800, which emphasizes the "Custom" category 802 of user selectable 2D elements. Custom 2D elements, as used herein, may refer to 2D configurations previously assembled/generated, and stored for later use as a single 2D element. As an example, a user may assemble/generate a 2D configuration by selecting and arranging a plurality of 2D elements, and may wish to have access to this 2D configuration in the future, without re-assembling the 2D configuration from the 2D elements. Accordingly, the user may export the assembled 2D configuration as a custom 2D element, which may comprise saving the 2D configuration to memory as a single 2D element, thereby locking-in the relationships expressed by the 2D configuration. Within GUI 800, a custom 2D element, the "Tax Rate" 2D element 804a, is shown. "Tax Rate" 2D element 804a may comprise a pre-built function/2D configuration which may take one or more arguments, and which may perform various mathematical/logical operations on the one or more input arguments to produce an output. In the example shown in FIG. 8, the "Tax Rate" 2D element 804a may calculate a percent of income which is to be taxed based on a the current year, a user's income, and a user's relationship status. In the example shown, "Tax Rate" 2D element 804a may take three 2D elements as input/arguments (where it will be appreciated that the three inputs/arguments may each further comprise a plurality of nested 2D elements), specifically, 2D elements corresponding to "Year" 806, "Income" 808, and "Status" 810. "Tax Rate" 2D element 804 may then automatically determine a tax rate based on the input data. "Year" 806, and "Income" 808 comprise a first slot, and a second slot, respectively, wherein a shape of the first slot and the second slot may correspond with a shape of one or more 2D elements which may be received by "Year" 806 and "Income" 808 as arguments.

GUI 800 further depicts "Tax Rate" 2D element 804b corresponding to one instance of the custom "Tax Rate" 2D element 804a populating workspace 820. In one example, "Tax Rate" 2D element 804a may be selected by a user from the dropdown menu within the "Custom" category 802, and responsive to said selection, "Tax Rate" 2D element 804b may populate workspace 820. In addition to the previously discussed features of "Tax Rate" 2D element 804a, "Tax Rate" 2D element 804b comprises a user selectable button 812, which enables a user to select a "Status" 814 from a pre-defined menu of status options. "Tax Rate" 2D element 804b illustrates one example of user guidance which may be provided by 2D elements according to the current disclosure, that is, by including user interactable features within a 2D element, such as drop down menus comprising a finite number of pre-determined, selectable fields, comments, or other types of user guidance, ease of use may be increased by enabling more intuitive understanding of how to interact with 2D elements, and how 2D elements interact with one another. Further, by providing user guidance through inclusion of interactable features such as those disclosed above, a user without extensive knowledge in a particular area may be enabled to generate correct expressions/formulae. As an example, a user without extensive knowledge of the tax laws may not be aware of every possible relationship status which is viably selectable (that is, is recognized under the law), and by providing a custom 2D element comprising a pre-populated menu of selectable relationship statuses, a user may more easily determine an applicable tax rate. Thus, a reliance on user knowledge may be reduced and additional functionality may be incorporated into a spreadsheet template through the creation and storage of customized elements.

FIG. 8B illustrates GUI 800. Features of GUI 800 previously introduced and described above may retain the same numbering as in FIG. 8A, and previously discussed and numbered elements may not be re-introduced in FIG. 8B. FIG. 8B shows "Tax Rate" 2D element 804b following user selection of button 812. Responsive to selection of button 812, drop down menu 816 is displayed. Drop down menu 816 comprises a list of pre-defined options which may be input into "Status" 810. Thus, drop down menu 816 limits the possibility of a user entering an invalid argument into "Status" 810.

Figure 9:
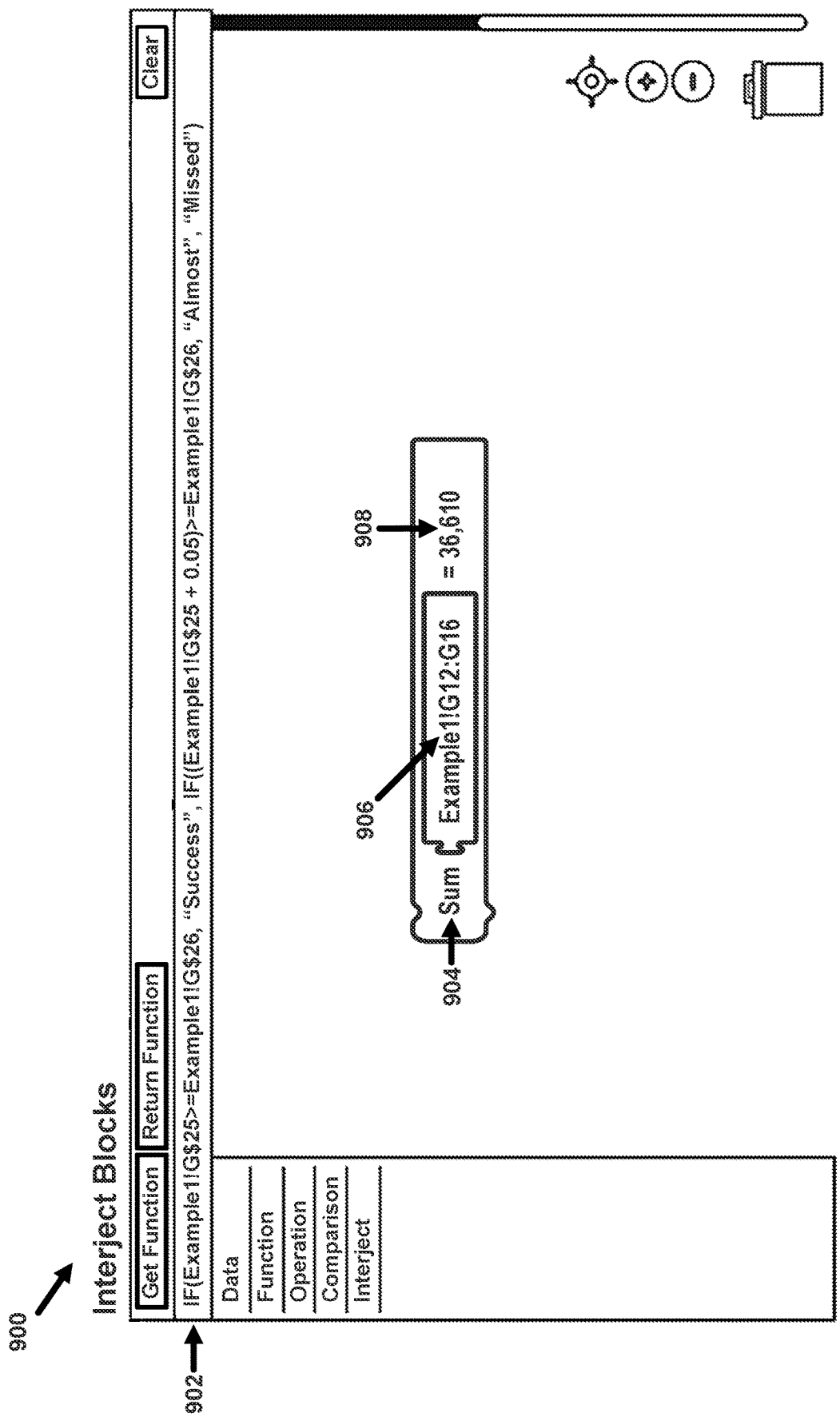

FIG. 9 illustrates one example of how a text expression may appear as a 2D configuration of 2D elements. The formula found in the cell of the connected spreadsheet is displayed in the formula window 902 of GUI 900. In one example, a user may have selected the cell containing this formula/text expression and clicked the "Get Function" button, causing the selected text expression to be mapped to a 2D configuration, wherein the 2D configuration represents the same mathematical/logical relationships contained in the selected text expression. In another example, the formula displayed in the formula window 902 may have been created de novo. A 2D element corresponding to a SUM( )function is represented by SUM 2D element 904. SUM 2D element 904 has data input 906 positioned within a cavity 907 of SUM 2D element 904, which indicates a mathematical relationship between SUM 2D element 904 and data input 906, specifically, data input 906 is acting as the argument of the sum function represented by SUM 2D element 904. While data input 906 may be entered manually or may comprise a series of values, in this instance data input 906 comprises a range of cells G12 through G16 from the corresponding spreadsheet, G representing the vertical columns and 12 through 16 the horizontal rows. Thus, all the data in those cells will be used as values input into the SUM function represented by SUM 2D element 904. If the formula represented by the 2D configuration is calculable as it is written, the output value will be displayed within the 2D element corresponding to the function as shown at 908. In this case, the output of the SUM function represented by SUM 2D element 904, dictated by Example1!G12:G16 is 36,610.

Figure 10:
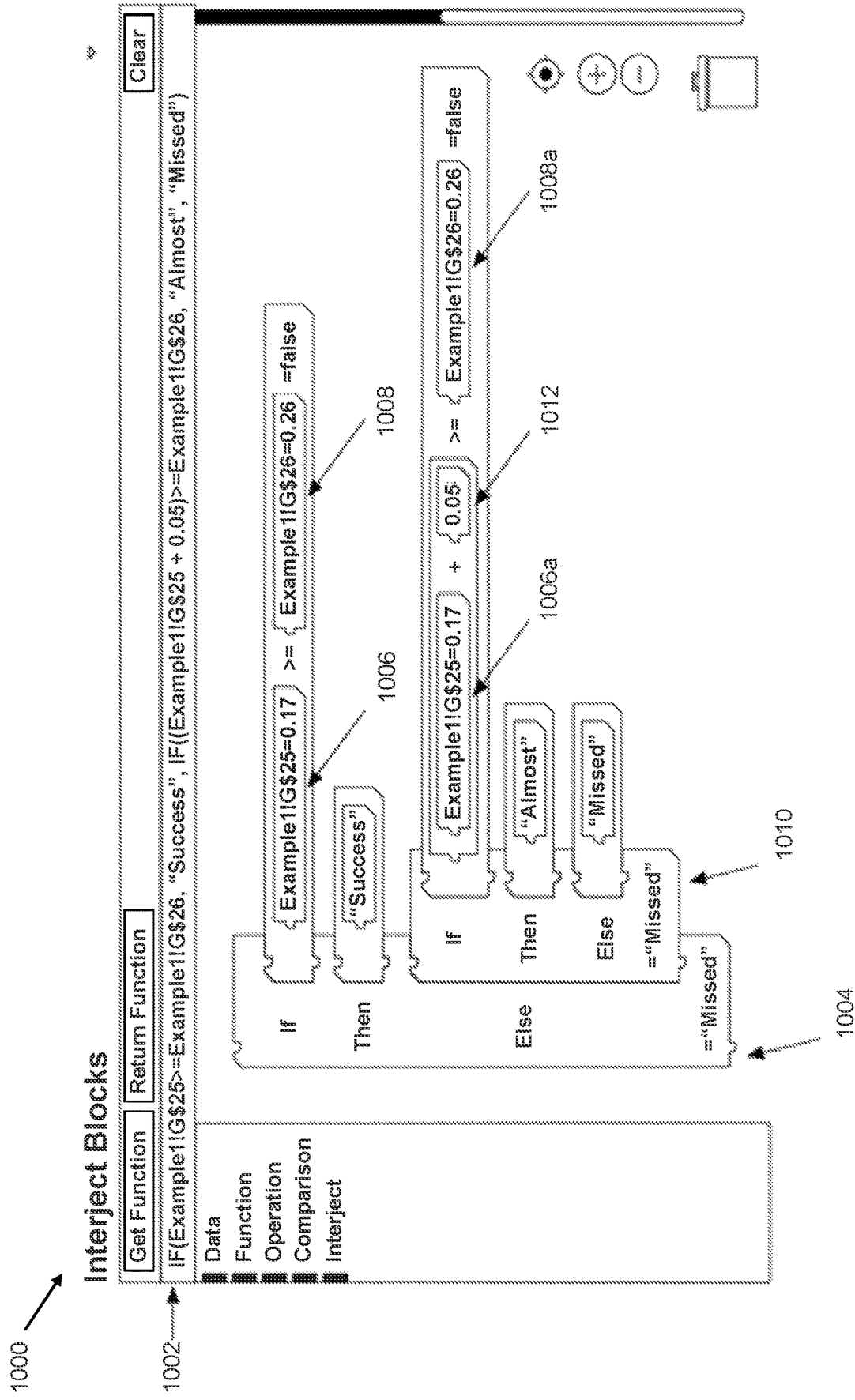

FIG. 10 illustrates GUI 1000, which depicts a 2D configuration equivalent to a text expression. The conditional formula/text expression appears at the top of GUI 1000 in formula window 1002, just as it would be written in the cell of a spreadsheet. The formula is then broken into the constituent parts or syntactic elements, each of which may be represented graphically using 2D elements. IF/THEN/ELSE 2D element 1004 checks whether example formula 1006 is greater than or equal to example formula 1008 and either gives the result "success", or else executes another conditional. Because in this example the formula 1006 is not greater than or equal to example formula 1008, the result of the comparison is false (as shown on the right side of the corresponding 2D element), and conditional 1010 will be executed. The 2D configuration of FIG. 10 is comprised of a plurality of 2D elements, and for each 2D element producing a result, the result may be displayed within the corresponding 2D element. As an example, IF/THEN/ELSE 2D element 1004 visually indicates that the output of this conditional expression is "Missed", which visually indicates the output of the conditional expression based on the current arguments fed into IF/THEN/ELSE 2D element 1004. As another example, formula 1006, which graphically represents data contained within a cell of a spreadsheet, visually indicates the numerical value of the data held therein, which is shown to be 0.17. In this way, a user may rapidly determine the output of each 2D element of a 2D configuration, which may enable a more user friendly experience, and may further enable more rapid identification of an error within a text expression by rendering the text expression as a 2D configuration.

The conditions of conditional 1010 to be satisfied are similar to those in the exterior conditional 1004 except that example formula 1006*a* (0.17) will be summed with static value 1012 (0.05) before it is compared to example formula 1008*a*. Also like exterior conditional 1004, the results of the comparison will be either "true" or "false". In this case the result is "false", since formula 1006*a* (0.17) plus value 1012 (0.05) is still not greater than or equal to example formula 1008*a*. Thus, the "else" result of interior conditional 1010 will be executed, and "missed" will be the final result of conditional 1010 and, therefore, conditional 1004 as well.

Figure 11:
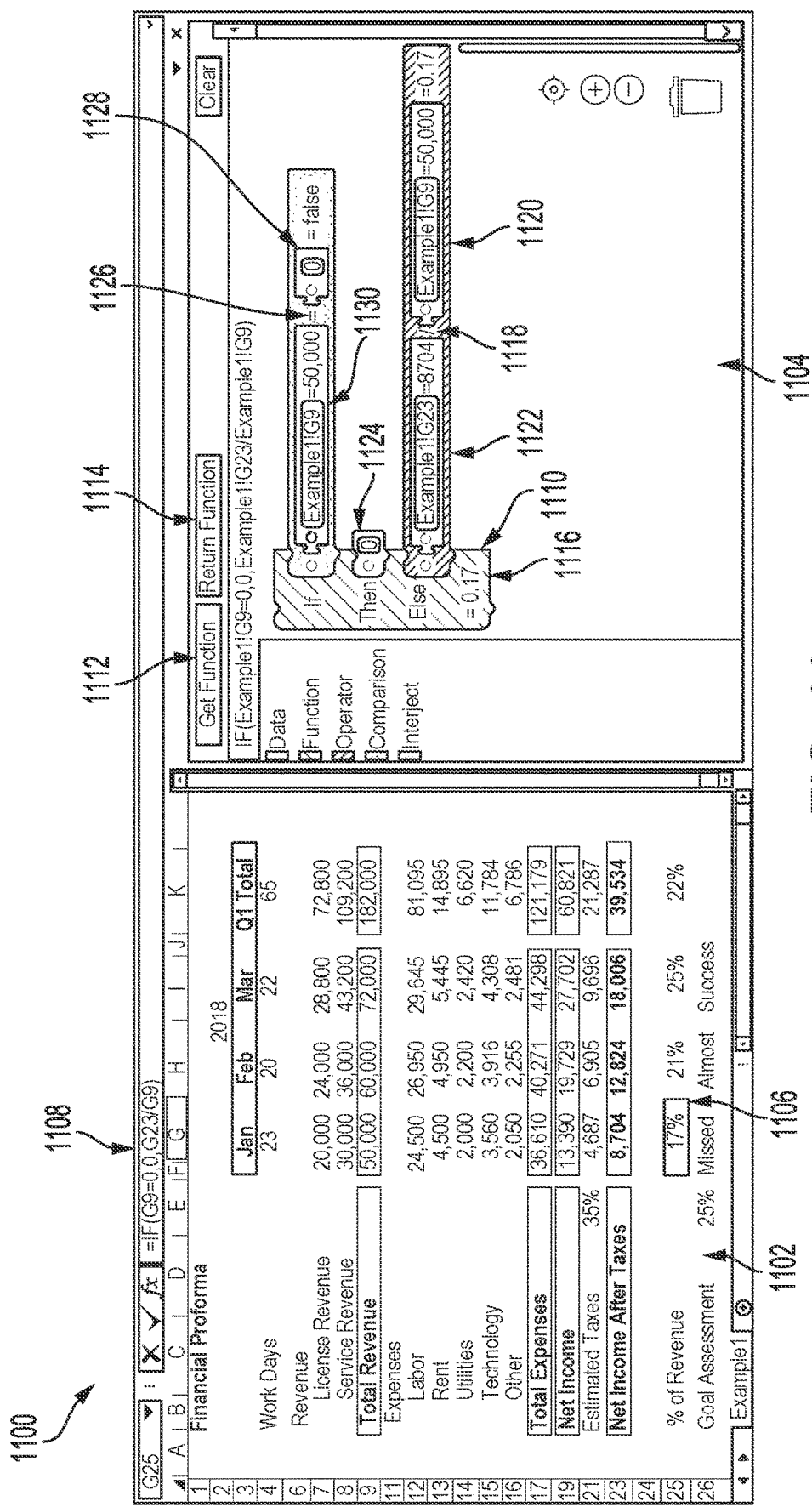

FIG. 11 shows one example of a split screen display 1100 for displaying both a spreadsheet 1102, and a GUI 1104 for use in displaying, generating, and/or modifying 2D configurations graphically representing text expressions for use with the spreadsheet 1102. By simultaneously displaying both the spreadsheet 1102 and the GUI 1104, a user may more easily import/export text expressions/formula to/from one or more selection spreadsheet cells. In one example, a user may make a selection of one or more spreadsheet cells from spreadsheet 1102 and import the one or more text expressions contained within the selected spreadsheet cells into GUI 1104 where a 2D configuration representing the imported text expression may be generated and displayed. The displayed 2D configuration, which may comprise a plurality of 2D elements, may have a relative position of a first 2D element modified with respect to a second 2D element, thereby altering the 2D configuration from a first 2D configuration to a second 2D configuration, wherein the second 2D configuration may correspond to a text expression distinct from the originally imported text expression. The new text expression may then be exported back to spreadsheet 1102 by selecting one or more spreadsheet cells and clicking on the "Return Function" button. This is simply an illustrative example, and is not intended to limit the scope of the current disclosure in anyway.

As shown in FIG. 11, selected cell 1106 corresponds to cell address G25 of spreadsheet 1102. Selected cell 1106 may have been selected by a user via input from a user input device. Although a single cell is selected in FIG. 11, it will be appreciated that the current disclosure provides for selection of one or more cells, such as by simultaneous selection of a range of cells, or serial selection of a plurality of cells. Selected cell 1106 comprises text expression 1108, which comprises a linear text expression representing a logical and mathematical relationship between one or more data elements contained in spreadsheet 1102. 2D configuration 1110 graphically represents/corresponds to text expression 1108. In one example, responsive to user selection of cell 1106, and further responsive to the user selecting "Get Function" 1112, 2D configuration 1110 may be generated based on the plurality of syntactic elements within text expression 1108 by mapping each syntactic element to a corresponding 2D element, and arranging/positioning each of the 2D elements within GUI 1104 based on a syntactic relationship between the syntactic elements of text expression 1108. Once a text expression has been imported from spreadsheet 1102 into GUI 1104, and mapped to a 2D configuration, such as 2D configuration 1110, the text expression may be modified by a user. In one example, 2D configuration 1110 may be modified by adjusting a position of one or more 2D elements within/comprising 2D configuration 1110, such that a positional/spatial relationship between the 2D elements of the 2D configuration 1110 is modified, which may be mapped to a modified syntactic relationships within a text expression. In another example, 2D configuration 1110 may be modified by adding/removing one or more 2D elements, thereby adding/removing one or more syntactic elements within the underlying text expression (text expression 1108).

2D configuration 1110 comprises a plurality of 2D elements corresponding to the syntactic elements of text expression 1108. More specifically, 2D configuration 1110 comprises IF/THEN/ELSE 1116, which further comprises comparison 1126, value 1124, and division operator 1118. IF/THEN/ELSE 1116 corresponds to the syntactic element "IF( , )" of text expression 1108, and receives three arguments, a comparison, and a first and second value. IF/THEN/ELSE 1116 comprises three indentations which visually indicates IF/THEN/ELSE 1116 may receive three arguments. IF/THEN/ELSE 1116 takes comparison 1126 as a first argument, as indicated by the spatial relationship between IF/THEN/ELSE 1116 relative to comparison 1126, specifically, the position of comparison 1126 within the first indentation of IF/THEN/ELSE 1116 (labeled with "If"), corresponds to a syntactic relationship between the syntactic element "IF(, ,)" and the syntactic element "=". Comparison 1126 is configured to receive two arguments (as may be the case with all binary operators and comparisons). Specifically, comparison 1126 receives data element 1130 and checks for equality with value 1128. Data element 1130 comprises a 2D element corresponding to data held within cell G9 of spreadsheet 1102, while value 1128 comprises a data element not associated with a spreadsheet cell. Further, comparison 1126 displays the result of the comparison between data element 1130 and value 1128, which, in the example shown in FIG. 11, is "false", that is, there is not numerical equality between data element 1130 and value 1128. Numerical and/or logical results of computations/comparisons may be displayed within 2D elements corresponding to said computation/comparison, such as illustrated in the case of comparison 1126, which displays the result ("false") of the logical equality comparison represented by comparison 1126.

IF/THEN/ELSE 1116 further comprises value 1124, which is to be the output of IF/THEN/ELSE 1116 responsive to the first and second argument of comparison 1126 being numerically equivalent. That is, if the result of comparison 1126 were "true", the output of IF/THEN/ELSE 1116 would be value 1124 (0).

IF/THEN/ELSE 1116 further comprises division operator 1118, which takes a first argument, data element 1122, and a second argument, data element 1120, and outputs the result of the division of the first argument, data element 1122, by the second argument, data element 1120. Data element 1122 corresponds to the data contained in cell G23 of spreadsheet 1102, while data element 1120 corresponds to the data contained in cell G9 of spreadsheet 1102. The result of the division represented by division operator 1118 is shown within division operator 1118 (which is 0.17 in the example shown in FIG. 11). In the example shown in FIG. 11, as the result of comparison 1126 is "false", the output of the IF/THEN/ELSE 1110 will be 0.17 (the result of division operator 1118, which corresponds to the ELSE portion of IF/THEN/ELSE 1110). The overall output of IF/THEN/ELSE 1110 is shown within IF/THEN/ELSE 1110, near the bottom, thus visually indicating the overall result of 2D configuration 1110. By displaying the result of each 2D element, as well as the result of the overall 2D configuration, a user may more easily determine if a 2D configuration (and a corresponding text expression) perform as expected, or contain any errors (logical, and/or typographical), thereby reducing a probability of incorporation of an error into a spreadsheet, and further enabling easier identification of an error when an error is incorporated. As one example, a result of a 2D configuration may be determined to be incorrect, and by displaying the result (numerical/logical output) of each 2D element comprising the 2D configuration, the offending/erroneous 2D elements may be rapidly identified and corrective action may be taken. This contrasts with the conventional method of error identification and isolation in a spreadsheet, which may be very complicated, as a cell may output a single result, and in many cases the final result is the composite of many sub-results, thus a user may be required to visually parse through each sub-expression within a longer text expression and perform mental calculations in order to determine where an error occurs.

FIG. 11 further illustrates "Return Function" 1114. "Return Function" 1114 may enable a user to export one or more 2D configurations from GUI 1104 to one or more spreadsheets and/or computing systems. In one example, exporting a 2D configuration may comprise converting the 2D configuration to a text expression by mapping each 2D element to a syntactic element before storing the text expression in one or more selected spreadsheet cells. In another example, exporting a 2D configuration may comprise storing the 2D configuration as a "custom" 2D configuration/element for later use, such as by saving the 2D configuration in a library which the user may later access and/or share with one or more additional users/computing devices. In one example, responsive to user selection of a 2D configuration, and further responsive to the user selecting one or more spreadsheet cells, a user may select "Return Function" 1114 to convert the selected 2D configuration to an equivalent text expression, and store the text expression in the one or more selected spreadsheet cells. In this way, a 2D configuration, may be easily shared between multiple users, without requiring sharing of an entire spreadsheet, thereby making generation and distribution of spreadsheet formula more efficient and easy.

Turning to FIG. 12, an example method 1200 for visualizing and modifying text expressions as 2D configurations is shown. Method 1200 may be implemented by a computing system, such as computing system 1602 shown in FIG. 16. Method 1200 may enable a user to import a text expression from one or more cells of a spreadsheet, convert the text expression to a 2D configuration, and manipulate the 2D configuration thereby modifying the underlying text expression. In this way method 1200 may enable users to work with text expressions in grid based software applications.

Method 1200 begins at 1202, where the method includes selecting one or more cells in a grid-based application for example, spreadsheet cells. In one example, selecting spreadsheet cells may be accomplished based on input from a user input device, such as a mouse, keyboard, gesture based reader, microphone, trackball, light pen, stylus, scanner, digital camera, joystick, touchscreen, or other user input device. The selection may comprise one or more cells, wherein each selected cell may comprise one text expression. Method 1200 may then proceed to 1204.

At 1204, method 1200 includes importing the one or more text expressions contained in the one or more selected cells. In one example, importing the text expression comprises copying the text expression from the one or more cells of the spreadsheet into an addin program operating alongside, or as part of, the primary spreadsheet program. As another example, as part of the process of importing the text expression of the selected cell(s), the text expression may be displayed in a graphical user interface, such as in one of the graphical user interfaces disclosed herein, and in this way a user may receive a visual indication of the text expression with which they are working. Method 1200 may then proceed to 1206.

At 1206 method 1200 may include converting the imported text expression(s) to one or more 2D configurations. As one example, each imported text expression may be converted to a 2D configuration and displayed via a graphical user interface on a display subsystem of a computing device, wherein each 2D configuration may comprise at least one 2D element, and wherein a unique 2D configuration is defined by both the 2D elements comprising it, as well as the relative position of each element within the 2D configuration, such that changing the connections/positions between elements within a 2D configuration may equate to transforming the 2D configuration from a first 2D configuration into a second 2D configuration. The 2D configuration may graphically represent the logical/mathematical relationships contained by the text expression from which it was produced. In one example, conversion of a text expression to a 2D configuration may comprise parsing each syntactic element in a text expression, evaluating the relationship between each syntactic element and each other syntactic element (herein referred to as a syntactic relationship), and mapping the syntactic elements to 2D elements, and mapping the syntactic relationships to positional relationships between the 2D elements. As a specific example, in the text expression "2–5", the "2", the "–", and the "5" comprise syntactic elements, while the syntactic relationships, indicated by the position of each syntactic element within the text expression, comprise the way the 2 relates to the 5 via the minus (–) operator. Thus, in the preceding example, the 2, the –, and the 5, may each be mapped to a 2D element graphically representing the 2, the –, and the 5. The three 2D elements are arranged relative to one another based on the syntactic relationships between each element in the original text expression to form a 2D configuration. Specifically, the position of the three 2D elements forming the 2D configuration may visually indicate that the 5 is being subtracted from the 2. A second text expression, such as "5–2", may have a second corresponding 2D configuration, wherein the second 2D configuration comprises the same three 2D elements as the first 2D configuration, but is distinct from the first 2D configuration based on a distinct spatial/relative position of the three 2D elements. Once the imported text expression(s) are converted to 2D configurations, method 1200 may proceed to 1208.

At 1208, method 1200 may include modifying the 2D configuration. As an example, modifying the 2D configuration may comprise adding/removing 2D elements comprising the 2D configuration, and/or altering the position of one or more 2D elements comprising the 2D configuration relative to one or more other components of the 2D configuration. For example, the 2D configuration generated by converting the text expression "2–5", which comprises three 2D elements in a first configuration, may be altered by deleting the 2D element corresponding to the 5, adding a 2D element corresponding to a 7, and placing the 2D element corresponding to the 7 in the position of the 2D element corresponding to the 2 (relative to the position of the 2D element corresponding to the –), while moving the 2D element corresponding to the 2 into the position corresponding to the original position of the 2D element corresponding to the 5, thereby generating a new 2D configuration which may be logically/mathematically equivalent to the text expression "7–2". Modifying the 2D configuration may be accomplished by input from a user input device, such as by a mouse, keyboard, touchscreen, or other device. In one example, a user may modify/interact with a spreadsheet and/or 2D configuration via a computing device connected to a server via an internet connection, wherein the server implements the spreadsheet, and addin program, while the computing device of the user remotely accesses and manipulates data stored on the server, such as in a Software As A Service (SAAS) architecture. Method 1200 may then proceed to 1210.

At 1210, method 1200 may include mapping/converting the modified 2D configuration to a text expression. As one example, the process of converting a 2D configuration to a text expression may be accomplished in an analogous manner to that used to convert a text expression to a 2D configuration, specifically, by mapping each 2D element to a syntactic element, and by determining an arrangement of each syntactic element based on the positional/structural arrangement of the 2D configuration. In one example, a map relating syntactic elements with 2D elements, and syntactic relationships with 2D spatial relationships, may be stored in a memory of a computing system, or may be remotely accessed by a first computing system from a memory of a second computing system. Once the modified 2D configuration is mapped to an updated text expression (that is, updated relative to the first text expression), method 1200 may proceed to 1212.

At 1212, method 1200 may include exporting the updated text expression to the one or more spreadsheet cells selected in step 1202 of the method or to different spreadsheet cells. As an example, if a single spreadsheet cell was selected at step 1202, step 1212 may comprise replacing the original text expression within the cell with the updated text expression generated at step 1210. As another example, if multiple spreadsheet cells were selected at step 1202, step 1212 may include inputting the updated text expression into each selected spreadsheet cell, thereby replacing the prior contents of each cell. Said another way, step 1212 may comprise overwriting the contents of each selected spreadsheet cell with the updated text expression generated in step 1210. Method 1200 may then end.

Thus, method 1200 illustrates one example method according to embodiments of the current disclosure which may enable a more efficient spreadsheet workflow, by enabling users to view text expressions in a way which makes better use of the 2-dimensions of a display subsystem of a computing system, thereby increasing readability of potentially complex text expressions by rendering said text expressions as 2D configurations, wherein the 2D configurations may comprise one or more 2D elements, which may be visually indicative of the role/function/behavior of the corresponding syntactic element of the text expression.

Turning to FIG. 13, example method 1300 for visualizing and modifying text expressions in grid based software is shown. Method 1300 may be implemented by a computing system, such as computing system 1602 shown in FIG. 16. Method 1300 may enable 2D visualization of text expressions (which comprise substantially 1-dimensional visualizations) by mapping syntactic elements and syntactic relationships to 2D elements and positional relationships between the 2D elements, respectively.

Method 1300 begins at 1302, where the method includes selecting one or more spreadsheet cells of a grid based program. As an example, step 1302 may comprise selecting a single spreadsheet cell, such as by clicking the spreadsheet cells using a mouse cursor. In another example, step 1302 may comprise selecting a range of cells, such as by holding shift while left clicking on one or more cells to be selected. Once the desired selection of spreadsheet cells has been made, method 1300 may proceed to 1304.

At 1304, method 1300 may include parsing text expressions within one or more or of the selected spreadsheet cells. As an example, upon selecting a plurality of spreadsheet cells, containing a single text expression each, a plurality of 2D configurations representing the plurality of spreadsheet cells may be generated according a method, such as method 1300. In one example, parsing text expressions within the selected spreadsheet cells may comprise logically identifying each syntactic element in a text expression, or may comprise storing one or more syntactic elements in a distinct location in memory of a computing system. Once the text expression(s) have been parsed into one or more syntactic elements, such that each syntactic element cannot be further decomposed into smaller, meaningful, syntactic elements, method 1300 may proceed to 1306.

At 1306, method 1300 may include mapping the parsed syntactic elements to 2D elements. In one example, the one or more characters comprising a first syntactic element may be mapped to a first 2D element using a pre-defined map or lookup table, and a second, different, syntactic element may be mapped to a second 2D element using the same, or a different, pre-defined map or lookup table. In another example, the logic of mapping syntactic elements to 2D elements may be more complex, and may utilize conditional logic, such as in determining that within the text expression "SUM(12,3,4,5)", SUM( )comprises a single syntactic element, and may therefore be mapped to a single 2D element. Step 1306 may further include mapping one or more syntactic relationships between one or more syntactic elements to a positional relationship between one or more 2D elements, thereby generating a 2D configuration comprised of one or more 2D elements in a spatial relationship reflective of the syntactic relationships in the text expression. Once each of the syntactic elements of the one or more text expressions has been mapped to one or more 2D elements, and the 2D elements have been arranged based on the syntactic relationships between the syntactic elements, method 1300 may proceed to 1308.

At 1308, method 1300 includes displaying the 2D configuration via a graphical user interface as shown in FIGS. 9 and 10. Method 1300 may then proceed to 1310. At 1310, method 1300 may include determining if the user has selected to add or remove a 2D element to/from the 2D configuration displayed via the graphical user interface. In one example, a user may select to add a 2D element from a pre-defined library of 2D elements by using a drop down menu, such as those depicted by example in FIGS. 3-11. In another example, a user may select to remove/delete a 2D element by clicking on the 2D element and dragging the element to a specified region, such as a trash bin icon. If at 1310 it is determined that the user has not selected to add or remove a 2D element from the currently displayed 2D configuration, method 1300 may proceed to 1314. However, if at 1310, it is determined that the user has selected to add or remove a 2D element, method 1300 may proceed to 1312.

At 1312 method 1300 may include adding/removing the selected 2D element. In one example, adding a 2D element may comprise populating the graphical user interface with an instance of a 2D element corresponding to a 2D element selected by the user via a user input device and/or via a drop down menu of the graphical user interface. In another example, removing a 2D element may comprise depopulating the graphical user interface of the selected 2D element. Upon adding/removing the selected 2D element, method 1300 may proceed to 1314.

At 1314, method 1300 may comprise determining if a user has selected to adjust the position of a 2D element. In one example, input from a user input device may indicate selection of a 2D element of the currently displayed 2D configuration, such as by selection via a cursor corresponding to a position of a mouse, a user finger as tracked by a touchscreen, or a user gesture as may be tracked by a camera. If at 1314 it is determined that a user has not selected to adjust a position of a 2D element, method 1300 may proceed to 1318. However, if at 1314 it is determined that a user has selected to adjust the position of a 2D element, method 1300 may proceed to 1316.

At 1316, method 1300 may comprise adjusting the position of the 2D element based on input received from a user input device. In one example, a user may specify a new location for the 2D element by entering values into a text box, such as by manually entering an x and y coordinate to position the 2D element at. In another example, a user may specify a location for the 2D object by selecting and dragging the 2D element, such as by action of a finger on a touchscreen, or a mouse, or by action of another user input device. By adjusting the position of the 2D element, a syntactic relationship of the syntactic element within a text expression in the underlying text expression may be likewise changed. Once the 2D element's position has been adjusted based on user input, method 1300 may proceed to 1318.

At 1318, method 1300 may include evaluating if the user has selected to export the currently displayed 2D configuration. In one example, a user may select to export to the currently displayed 2D configuration by clicking on a "return function" button, such as is displayed in FIGS. 3-5. In another example, a user may select to export the currently displayed 2D configuration by double clicking on a spreadsheet cell, or alternatively, by double clicking on the 2D configuration. In other embodiments, a user may select to export the currently displayed 2D configuration by other gestures or input. If at 1318, it is determined that the user has not selected to export the currently displayed 2D configuration, method 1300 may return to 1310, and the user may continue to add/remove 2D elements, and modify/adjust/alter the position of one or more 2D elements relative to one or more additional 2D elements. However, if at 1318 it is determined that the user has selected to export the currently displayed 2D configuration, method 1300 may proceed to 1320.

At 1320, method 1300 may include mapping the currently displayed 2D configuration to a text expression, such as was discussed in reference to step 1210 of method 1200 above. In one example, the one or more 2D elements and one or more spatial relationships between the 2D elements may be mapped to text expressions using a pre-defined map stored in non-transitory memory of a computing system. Once the 2D configuration is mapped/converted to a text expression, method 1300 may proceed to 1322.

At 1322, method 1300 may updated the text expressions of the one or more selected spreadsheet cells, which may result in one or more additional spreadsheet cells updating. In one example, updating a spreadsheet cell may comprise overwriting the data previously stored in a location of memory corresponding to the spreadsheet cell. After the one or more selected spreadsheet cells are updated with the text expression, method 1300 may end.

In this way, text expressions within one or more spreadsheet cells may be visualized as 2D configurations, the 2D configurations may then be modified, and the modified 2D configuration may be mapped back to a text expression to and written into the one or more spreadsheet cells, and in this way, unwieldy text expressions written into spreadsheet cells may be made more manageable, both by those familiar with working with spreadsheets and spreadsheet formula, and for those less familiar.

Turning now to FIG. 14, a method 1400 for generating de novo mathematical relationship/logical relationships using 2D elements, and converting 2D elements and configurations into a text expression, wherein the text expression is then exported/written into one or more spreadsheet cells is shown. Method 1400 may be implemented by a computing system, such as computing system 1602 shown in FIG. 16.

Method 1400 begins at 1402, which may include initiating the graphical user interface. In one example, the graphical user interface may comprise a space on a display subsystem of a computing system in which 2D elements and 2D configurations may be displayed and manipulated. Examples of graphical user interfaces according to the current disclosure are shown in FIGS. 3-11. Once the graphical user interface is initiated, method 1400 may proceed to 1404.

At 1404, method 1400 may include displaying a library of pre-defined 2D elements. In one example, the library may comprise a plurality of categories, wherein each category corresponds to a class of syntactic elements. In one example, the categories may comprise functions, operators, comparisons (greater than, less than, equal to, IF THEN, etc.), and custom functions (which may be defined and customized by the user). A user may interact with the pre-defined library of 2D elements using a user input device. Method 1400 may then proceed to 1406.

At 1406, method 1400 may include evaluating if the user has selected to add an additional 2D element to the display area of the graphical user interface from the pre-defined library. In another example, the display area of the graphical user interface may be populated by one or more 2D configurations based on a user selection of one or more spreadsheet cells containing text expressions. If at 1406 it is determined that the user has not selected a 2D element from the pre-defined library, method 1400 may return to 1402. However, if at 1406, a user has selected one or more 2D elements from the pre-defined library, method 1400 may proceed to 1410.

At 1410, method 1400 comprises adding the selected 2D element to the display area of the graphical user interface. In one example, the selected 2D element is graphically rendered within a "workspace" region of the graphical user interface. Method 1400 may then proceed to 1412.

At 1412, method 1300 may comprise determining if a user has selected to adjust the position of a 2D element. In one example, input from a user input device may indicate selection of a 2D element of the currently displayed 2D configuration, such as by selection via a cursor corresponding to a position of a mouse, a user finger (as tracked by a touchscreen), joystick, track ball, light pen, or a user gesture as may be tracked by a camera. If at 1412 it is determined that a user has not selected to adjust a position of a 2D element, method 1400 may proceed to 1416. However, if at 1412 it is determined that a user has selected to adjust the position of a 2D element, method 1400 may proceed to 1414.

At 1414, method 1400 may comprise adjusting the position of the 2D element based on input received from a user input device. In one example, a user may specify a new location for the 2D element by entering values into a text box, such as by manually entering an x and y coordinate position for 2D element. In another example, a user may specify a location for the 2D object by selecting and dragging the 2D element, such as by action of a finger on a touchscreen, or a mouse, or other user input device. Once the 2D element's position has been adjusted based on user input, method 1400 may proceed to 1416.

At 1416, method 1400 may include evaluating if the user has selected to export the currently displayed 2D configuration. In one example, a user may select to export the currently displayed 2D configuration by clicking on a "return function" button, such as is displayed in FIGS. 3-6 and 8-11. In another example, a user may select to export the currently displayed 2D configuration by double clicking on a spreadsheet cell, or alternatively, by double clicking on the 2D configuration. In other embodiments, a user may select to export the currently displayed 2D configuration by other gestures or input. If at 1416, it is determined that the user has not selected to export the currently displayed 2D configuration, method 1400 may return to 1406, and the user may continue to add 2D elements from the pre-defined library, and modify/adjust/alter the position of one or more 2D elements relative to one or more additional 2D elements. However, if at 1416 it is determined that the user has selected to export the currently displayed 2D configuration, method 1400 may proceed to 1418.

At 1418, method 1400 comprises receiving a user's selection of one or more "target" spreadsheet cells to indicating a location to export/write the text expression to. In one example, a user may select a region of cells to write the text expression to, wherein the text expression is generated by mapping the 2D configuration comprised of one or more 2D elements to, and wherein the user selection is made by clicking on one or more spreadsheet cells. Method 1400 may then proceed to 1420.

At 1420, method 1400 may include mapping the 2D configuration to a text expression, as previously discussed above. Method 1400 may then proceed to 1422, where the method may include exporting the text expression to the selected cells, as previously discussed above. Method 1400 may then end.

In this way, method 1400 may enable a user the to generate mathematical/logical relationships of any degree of complexity, in a more easily visually processed way, which may further decrease incorporation of errors into the newly generated functions/formula/text expression etc. by enabling a user the ability to easily visually identify such errors before exporting the generated mathematical relationship to the spreadsheet or other grid-based application.

FIG. 15 shows an example method 1500 for searching a spreadsheet for instances of a text expression matching a 2D configuration selected by the user. The 2D configuration may be logically equivalent to a mathematical/logical relationship expressed by a text expression entered into one or more spreadsheet cells, each spreadsheet cell containing the text expression may be visually indicated by method 1500. In one example, a user may select a 2D element representing an "AVERAGE( )" function, and via a method, such as method 1500, the user may search all or part of a spreadsheet for instances of the "AVERAGE( )" function. In one example, visual indication of instances of mathematical/ logical relationships equivalent to the selected 2D configuration may comprise highlighting each spreadsheet cell where the instance(s) occur. In another example, a user may select two or more 2D elements, and arrange/position the two or more 2D elements into a 2D configuration representing a mathematical/logical relationship which may be used to search all or part of the spreadsheet. Method 1500 may at least partially address a current shortcoming of spreadsheets and other grid based software applications, specifically, the inability of current spreadsheets to search for instances of a text expression entered into one or more spreadsheet cells. Further, by searching the spreadsheet for instances of text expressions logically equivalent to a 2D configuration assembled/selected by a user, the previously articulated advantages associated with working with mathematical expressions using 2D configurations may be likewise conferred, namely, that even users unfamiliar with spreadsheet syntax, which may be required to enter formulae/expressions in spreadsheet cells, may be able to intuitively generate 2D configurations representing even very complex mathematical/logical relationships, which may then be used to search all or part of a spreadsheet. The steps of method 1500 may be executed by a computing system, such as computing system 1602 illustrated in FIG. 16.

Method 1500 begins at 1502, which may include selecting/assembling a 2D configuration comprised of one or more 2D elements. In one example, step 1502 of method 1500 may comprise a user selecting a single 2D element, such as a "SUM( )" function. In another example, step 1502 may comprise a user selecting a positive integer number of 2D elements, and spatially arranging the 2D elements into a 2D configuration which graphically represents a mathematical/logical relationship corresponding to a text expression, such as by selecting a "SUM( )" function, and positioning a 2D element representing a range of spreadsheet cells in relation to the 2D representation of the "SUM( )" function, the positioning indicating that the range of spreadsheet cells is an argument of the "SUM( )" function (and therefore that the values entered into the range of cells may be operated on by the "SUM( )" function to produce a sum of the values within the spreadsheet cells). As an example, selecting a 2D element may comprise a user selecting a pre-defined 2D element from a menu of a graphical user interface, such as those interfaces shown in FIGS. 3-11. In another example, selecting a 2D element and/or configuration may comprise a user selecting a spreadsheet cell, wherein the spreadsheet cell contains a text expression, and populating the graphical user interface with a 2D element and/or 2D configuration corresponding to the text expression within the selected spreadsheet cell. Once a 2D element or 2D configuration has been selected, method 1500 may proceed to 1504.

At 1504, method 1500 may include selecting a region of spreadsheet cells, wherein the search to be conducted may occur within the selected region of spreadsheet cells. In one example, a default selection of spreadsheet cells may comprise the entire spreadsheet, such that all spreadsheet cells may be searched without further input from the user. One or more spreadsheet cells may be selected by any means conventional in the art of spreadsheets, such as by clicking (as with a mouse or touchscreen) a first spreadsheet cell, and dragging a cursor along the spreadsheet, selecting each spreadsheet cell over which the cursor passes, or by other conventional means of selecting one or more spreadsheet cells. In another example, a range/region of spreadsheet cells may be selected by inputting a range of cells into a text box, such as by specifying a region of cells entering a range of spreadsheet cells using the syntax conventional in the art of spreadsheets, such as "B1:B33", "D1:F11", etc. Once the user has made a selection of one or more spreadsheet cells to be searched, or alternatively has not made an explicit selection, and therefore a default selection is employed, method 1500 may proceed to 1506.

At 1506, method 1500 may include comparing each text expression in the selected region of spreadsheet cells with the selected 2D configuration/2D element of step 1502. In one example, searching the selected region of spreadsheet cells for instances of the mathematical/logical relationship expressed by the 2D configuration or 2D element may comprise first converting the 2D configuration or 2D element into an equivalent text expression. As a more specific example, a 2D element corresponding to an "IF THEN" statement may be converted to the text expression of an "IF THEN" statement, and then this text expression may be compared directly to the text expressions contained within one or more of the selected spreadsheet cells. As another example, searching the selected region of spreadsheet cells for instances of the mathematical/logical relationship expressed by the 2D configuration or 2D element may comprise first converting each text expression within the selected region of spreadsheet cells to 2D representations (either a 2D element, or an assemblage of 2D elements into a 2D configuration) before comparing the user selected 2D configuration or 2D element with each of the 2D elements/2D configurations corresponding to the text expression within the selected region of spreadsheet cells. As a more specific example, a text expression of a spreadsheet cell may match the 2D configuration being searched for, even if the text expression of the spreadsheet cell comprises additional expressions, that is, if the 2D element being searched for comprises a "+" operator, a text expression of "2+4" may match the searched 2D element, because the text expression contains the 2D element being searched for. In another example, if the 2D configuration being searched for comprises "3+", a text expression comprising "2+4" may not match the searched 2D configuration, while a text expression comprising "AVERAGE(3+5,3,5)" may match the searched 2D configuration, even though the text expression comprises additional syntactic elements. In one example, an address of each spreadsheet cell comprising a text expression matching the 2D configuration or 2D element being searched for, may be appended to a list of matching spreadsheet cells. Once each spreadsheet cell within the selected region of spreadsheet cells has been compared with the 2D configuration or 2D element being searched for, method 1500 may proceed to 1508.

At 1508, method 1500 comprises visually indicating which spreadsheet cells of the selected region of spreadsheet cells matched the 2D configuration or 2D element being searched for. In one example, a list comprising each of the spreadsheet cells within the selected region comprising text expression(s) matching the 2D configuration or 2D element being searched for may be compiled and displayed to the user via a graphical user interface. In another example, visually indicating which of the spreadsheet cells within the selected region of spreadsheet cells matches the 2D configuration or 2D element being searched for may comprise altering the display of the one or more matching spreadsheet cells, such as by altering a border color of said cells, or by placing a mark within the one or more matched spreadsheet cells. Additionally, it is within the scope of the current disclosure that step 1508 of method 1500 may further comprise displaying 2D configurations representing each of the matching text expressions within the selected region of spreadsheet cells, and in this way, a user may readily see the logical/mathematical structures/relationships comprising the selected 2D configuration being searched for. After each of the matching spreadsheet cells within the selected region of spreadsheet cells has been visually indicated/flagged, method 1500 may end.

Thus, method 1500 provides a novel and user friendly way to search a spreadsheet or other grid based software application for instances of logical/mathematical relationships/structures, even if the user has little or no previous experience with the syntax of spreadsheet type logical/mathematical expressions.

FIG. 16 schematically shows a non-limiting computing system 1602 that may perform one or more of the above described methods and processes. It is to be understood that virtually any computer architecture may be used without departing from the scope of this disclosure. In different embodiments, computing system 1602 may take the form of a mainframe computer, server computer, desktop computer, laptop computer, tablet computer, home entertainment computer, network computing device, mobile computing device, mobile communication device, gaming device, etc.

Computing system 1602 includes a logic subsystem 1604 and memory 1606. Computing system 1602 may optionally include a display subsystem 1608, user input device 1610, and/or other components not shown in FIG. 16.

Computing system 1602 may include user input device 1610. User input device 1610 may comprise any device capable of receiving a user motion or gesture and mapping the motion or gesture to data and/or manipulating data within memory 1610 based on the motion/gesture. In one example, user input device 1610 may comprise keyboards, track balls, light pens, optical/magnetic scanners, joysticks, mice, game controllers, cameras, microphones, and/or touch screens and the like.

Logic subsystem 1604 may include one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Memory 1606 may include one or more physical, non-transitory, devices configured to hold data and/or instructions executable by the logic subsystem to implement the herein described methods and processes. When such methods and processes are implemented, the state of memory 1606 may be transformed (e.g., to hold different data).

Memory 1606 may include removable media and/or built-in devices. Memory 1606 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Memory 1606 may include devices with one or more of the following characteristics: volatile, nonvolatile, dynamic, static, read/write, read-only, random access, sequential access, location addressable, file addressable, and content addressable. In some embodiments, logic subsystem 1604 and memory 1606 may be integrated into one or more common devices, such as an application specific integrated circuit or a system on a chip.

FIG. 16 also shows an aspect of the non-transitory memory in the form of removable computer-readable storage media 1618, which may be used to store and/or transfer data and/or instructions executable to implement the herein described methods and processes. Removable computer-readable storage media 1618 may take the form of flash drives, thumb drive, SD card, micro-SD card, CDs, DVDs, HD-DVDs, Blu-Ray Discs, EEPROMs, and/or floppy disks, among others.

It is to be appreciated that memory 1606 includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

When included, display subsystem 1608 may be used to present a visual representation of data held by memory 1606. In one example, display subsystem 1608 may be used to display graphical user interfaces, such as those illustrated in FIGS. 3-11. As the herein described methods and processes change the data held by the non-transitory memory, and thus transform the state of the non-transitory memory, the state of display subsystem 1608 may likewise be transformed to visually represent changes in the underlying data. Display subsystem 1608 may include one or more display devices utilizing virtually any type of technology, such as CRT, LCD, LED, OLED, ELD, PD, AMOLED, and QD displays. As another example, display subsystem 1608 may comprise a display projector device, such as a DLP projector, an LCoS projector, a laser projector, or an LED projector. Such display devices may be combined with logic subsystem 1604 and/or memory 1606 in a shared enclosure, or such display devices may be peripheral display devices.

When included, communication subsystem 1612 may be configured to communicatively couple computing system 1602 with one or more other computing systems. Communication subsystem 1612 may include wired and/or wireless communication devices compatible with one or more different communication protocols. As non-limiting examples, the communication subsystem may be configured for communication via a wireless telephone network, a wireless local area network, a wired local area network, a wireless wide area network, a wired wide area network, etc. In some embodiments, the communication subsystem may allow computing system 1602 to send and/or receive messages to and/or from other devices via a network such as the Internet. In another example, communication subsystem 1612 enables computing system 1602 to transmit and receive 2D configurations, spreadsheet data, and text expressions.

In some examples, computing device 1602 may include a grid-based application 1614 which may be operatively connected to logic subsystem 1604 and non-transitory memory 1606. Grid-based application 1614 may further include an addin configured to confer additional functionality to the grid-based application through the use of visual programming as described above. Computing device 1602 may also include at least one database 1616 or other suitable data source which may be accessed by the grid-based application 1614 to manage data contained in the database. In one example, database 1616 may comprise a data structure storing a plurality of syntactic elements and a plurality of corresponding 2D elements which uniquely link to the plurality of syntactic elements. In an example, database 1616 may comprise a map between syntactic elements and 2D elements, and may further comprise a map between syntactic relationships and structural/positional configurations of the 2D elements, thereby functionally providing a map between text expressions and 2D configurations.

The disclosure also provides support for a method comprising: selecting one or more spreadsheet cells, wherein the one or more spreadsheet cells comprise one or more text expressions; parsing the one or more text expressions into at least a first syntactic element; mapping the first syntactic element to a first 2D element; and displaying the first 2D element via a graphical user interface on a display subsystem. In a first example of the method, the method further comprising: parsing the one or more text expressions into a second syntactic element; mapping the second syntactic element to a second 2D element; and displaying the second 2D element via the graphical user interface on the display subsystem, wherein a first 2D configuration of the first 2D element and the second 2D element within the graphical user interface is based on a first syntactic relationship between the first syntactic element and the second syntactic element. In a second example of the method, optionally including the first example, the method further comprising: selecting a third 2D element from a pre-defined library of 2D elements, wherein the pre-defined library of 2D elements comprises a plurality of pre-defined 2D elements, each mapping to at least one or more syntactic elements or at least one and/or more syntactic relationships; and displaying the third 2D element via the graphical user interface on the display subsystem. In a third example of the method, optionally including the first and second examples, wherein at least one of the plurality of pre-defined 2D elements is a function, an operator, a range of cells, a comparison, or a single data element. In a fourth example of the method, optionally including the first through third examples, the method further comprising: selecting the first 2D element; moving the first 2D element from the first position to a second position relative to the second 2D element to form a second 2D configuration of the first 2D element and the second 2D element, wherein the second 2D configuration corresponds to a second syntactic relationship between the first syntactic element and the second syntactic element. In a fifth example of the method, optionally including the first through fourth examples, the method further comprising: mapping the second 2D configuration to a text expression; and exporting the text expression into the selected one or more spreadsheet cells. In a sixth example of the method, optionally including the first through fifth examples, wherein the 2D element comprises a geometrical shape.

The disclosure also provides support for a method comprising: selecting a first 2D element in a graphical user interface; selecting a second 2D element in the graphical user interface; positioning the first 2D element relative to the second 2D element to form a first 2D configuration of the first 2D element and the second 2D element; selecting one or more spreadsheet cells; mapping the first 2D configuration to a text expression; and exporting the text expression to the selected one or more spreadsheet cells. In a first example of the method, wherein selecting the first 2D element comprises selecting one of a plurality of pre-defined 2D elements. In a second example of the method, optionally including the first example, wherein selecting the first 2D element comprises selecting a user customized 2D element. In a third example of the method, optionally including the first and second examples, wherein the first 2D element maps to a function. In a fourth example of the method, optionally including the first through third examples, wherein the second 2D element maps to a text string representing data in a spreadsheet cell. In a fifth example of the method, optionally including the first through fourth examples, wherein the second 2D element maps to a text string representing data in a range of spreadsheet cells. In a sixth example of the method, optionally including the first through fifth examples, wherein the first 2D configuration indicates a syntactic relationship between the first 2D element and the second 2D element. In a seventh example of the method, optionally including the first through sixth examples, wherein the syntactic relationship is a mathematical relationship between the second 2D element and the first 2D element. In an eighth example of the method, optionally including the first through seventh examples, the method further comprising: responsive to a user selection of the one or more spreadsheet cells: mapping the text expression back to the first 2D configuration; selecting a third 2D element; positioning the third 2D element relative to the first 2D element and the second 2D element to form a second 2D configuration; mapping the second 2D configuration an updated text expression; and exporting the updated text expression to the selected one or more spreadsheet cells.

The disclosure also provides support for a method comprising: selecting a first 2D configuration comprising one or more 2D elements, wherein the 2D elements correspond to syntactic elements of a mathematical expression; selecting a region of spreadsheet cells; converting the 2D configuration to a first text expression; matching the first text expression with a second text expression responsive to the second text expression comprising the first text expression, wherein the second text expression is in a spreadsheet cell within the selected region of spreadsheet cells. In a first example of the method, the method further comprising adding a visual indicator to the spreadsheet cell indicating that the spreadsheet cell matches the first 2D configuration. In a second example of the method, optionally including the first example, the method further comprising converting the second text expression to a second 2D configuration, and displaying the second 2D configuration via a display subsystem. In a third example of the method, optionally including the first and second examples, the method further comprising: manipulating the displayed second 2D configuration based on input from a user input device to generate a third 2D configuration; and converting the third 2D configuration to a third text expression; and replacing the second text expression with the third text expression in the spreadsheet cell. In a fourth example of the method, optionally including the first through third examples, wherein the selected region of spreadsheet cells comprises an entire spreadsheet. In a fifth example of the method, optionally including the first through fourth examples, wherein the selected region of spreadsheet cells comprises one or more spreadsheet cells.

The disclosure also provides support for a first computing system comprising: a logic subsystem; a display subsystem; a communication subsystem; a user input device; and non-transitory memory, wherein the non-transitory memory comprises instructions that when executed by the logic subsystem cause the logic subsystem to: select one or more spreadsheet cells based on input from the user input device, wherein the one or more spreadsheet cells comprise a first text expression, and wherein the spreadsheet cells are within a spreadsheet stored in the non-transitory memory of the first computing system; convert the first text expressions into a first 2D configuration, wherein the first 2D configuration comprises one or more 2D elements; and display the first 2D configuration via a graphical user interface on the display subsystem. In a first example of the system, wherein the first computing system is communicatively coupled to a second computing system via the communication subsystem, and wherein the instructions when executed by the logic subsystem further cause the logic subsystem to: display the spreadsheet via the second computing system; receive a selection from the second computing system of the one or more spreadsheet cells comprising the first text expression; convert the first text expression into the first 2D configuration; and display the first 2D configuration via the second computing system. In a second example of the system, optionally including the first example, wherein the instructions when executed by the logic subsystem further cause the logic subsystem to: modify a position of the one or more 2D elements to transform the first 2D configuration into a second 2D configuration based on input from the second computing system; convert the second 2D configuration into a second text expression; update the one or more spreadsheet cells with the second text expression; display the updated one or more spreadsheet cells to both the first computing system and the second computing system.

Those having skill in the art will appreciate that there are various implementations by which text expressions entered within cells of a grid based software application may be visualized in a multi-dimensional format, and conversely, by which multi-dimensional representations may be converted to text expressions. The preferred method of implementation will vary with the context in which the method of visualization is deployed. If the implementer determines that identification of typographical errors is of paramount importance, the implementer may opt to visually emphasize in a multi-dimensional format those regions of the text expression which may be prone to occurrences of typographical errors. If an implementer determines that speed of multi-dimensional visualization of a text expression is of paramount importance, a complexity of a multi-dimensional representation may be decreased, such as by reducing a number of multi-dimensional elements to which syntactic elements may be mapped. If an implementer determines visually distinguishing each multi-dimensional element within a multi-dimensional visualization of a text expression is of paramount importance, the implementer may opt to increase a complexity of a mapping process between syntactic elements and multi-dimensional elements, such as by increasing a number of multi-dimensional elements, or a complexity of the shape/geometry of each multi-dimensional element. Hence, there are several possible implementations by which the processes described herein may be effected, none of which is inherently superior to the other in that any implementation to be utilized is a choice dependent upon the context in which the implementation will be deployed and the specific concerns (e.g., speed, flexibility, or predictability) of the implementer, any of which may vary.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof.

In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one Application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuits forming a communications device. (e.g., a modem, communications switch, or the like)

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
    selecting a spreadsheet cell in a spreadsheet based on input received from a user input device, wherein the spreadsheet cell comprises a text expression;
    parsing the text expression, using a logic subsystem, into at least a first syntactic element;
    parsing the text expression, using the logic subsystem, into a second syntactic element;
    mapping the first syntactic element, using the logic subsystem, to a first two-dimensional (2D) element;
    mapping the second syntactic element, using the logic subsystem, to a second 2D element;
    converting the first syntactic element to the first 2D element;
    converting the second syntactic element to the second 2D element; and
    displaying the first and second 2D element via a graphical user interface on a display subsystem, wherein a first 2D configuration of the first 2D element and the second 2D element within the graphical user interface is based on a first syntactic relationship between the first syntactic element and the second syntactic element, wherein the first syntactic relationship is rendered as a spatial relationship between the 2D elements, and wherein at least one of the first or second 2D elements is an operator or function,
    wherein the graphical user interface is different from the spreadsheet.

2. The method of claim 1, wherein the first syntactic element is distinct from the second syntactic element, and wherein a first shape of the first 2D element is a different shape from a second shape of the second 2D element.

3. The method of claim 2, wherein at least one of the first shape or the second shape is representative of the syntactic element.

4. The method of claim 1, wherein the first syntactic element is distinct from the second syntactic element, wherein a first color of the first 2D element is distinct from a second color of the second 2D element, and wherein the color is based on a category of the syntactic element.

5. The method of claim 1, the method further comprising:
selecting a third 2D element, based on input received from the user input device, from a pre-defined library of 2D elements stored in non-transitory memory, wherein the pre-defined library of 2D elements comprises a plurality of pre-defined 2D elements, each of the plurality of pre-defined 2D elements corresponding to one or more syntactic elements; and
displaying the third 2D element via the graphical user interface on the display subsystem.

6. The method of claim 5, wherein the plurality of pre-defined 2D elements comprise a 2D element corresponding to one of a function, a mathematical operator, a range of spreadsheet cells, a mathematical comparison, and a numerical value, wherein the 2D element corresponding to each function, mathematical operator, range of spreadsheet cells, mathematical comparison, and numerical value has a different shape.

7. The method of claim 1, the method further comprising:
selecting the first 2D element based on input received from the user input device; and
moving the first 2D element, based on input received from the user input device, from a first position to a second position relative to the second 2D element to form a second 2D configuration, wherein the second 2D configuration corresponds to a second syntactic relationship between the first syntactic element and the second syntactic element.

8. The method of claim 7, the method further comprising:
mapping, using the logic subsystem, the second 2D configuration to an updated text expression;
exporting the updated text expression, using the logic subsystem, into one or more spreadsheet cells; and
transmitting the updated text expression, via a communication subsystem, from a first computing system to a second computing system.

9. A method comprising:
selecting a first two-dimensional (2D) element in a graphical user interface based on input received from a user input device;
selecting a second 2D element in the graphical user interface based on input received from the user input device, wherein the second 2D element is a mathematical operator or function;
positioning the first 2D element relative to the second 2D element, via the user input device, to form a first 2D configuration, wherein the first 2D configuration represents a syntactic relationship between the first 2D element and the second 2D element;
selecting one or more spreadsheet cells using the user input device;
mapping the first 2D configuration, via a logic subsystem, to a text expression; and
exporting the text expression, via the logic subsystem, to the one or more spreadsheet cells, wherein the spreadsheet and the graphical user interface are different.

10. The method of claim 9, wherein selecting the first 2D element comprises selecting one of a plurality of pre-defined 2D elements from a pre-defined library via the user input device.

11. The method of claim 9, wherein selecting the first 2D element comprises selecting a user customized 2D element, wherein the user customized 2D element is stored in a library of pre-defined 2D elements.

12. The method of claim 9, wherein the first 2D configuration corresponds to a syntactic relationship between the first 2D element and the second 2D element.

13. The method of claim 12, wherein the syntactic relationship is a mathematical relationship between the second 2D element and the first 2D element.

14. The method of claim 9, wherein the first 2D element corresponds to one of a string, a numerical value, a mathematical operator, a logical comparison, and a data field.

15. The method of claim 9, the method further comprising:
responding to a user selection of the one or more spreadsheet cells by mapping the text expression back to the first 2D configuration using the logic subsystem;
selecting a third 2D element using the user input device;
positioning the third 2D element relative to the first 2D element and the second 2D element, using the user input device, to form a second 2D configuration;
mapping the second 2D configuration, using the logic subsystem, to an updated text expression;
exporting the updated text expression to the one or more spreadsheet cells; and
transmitting the updated text expression from a first computing system to a second computing system, using a communication subsystem.

16. A computing system comprising:
a logic subsystem;
a display subsystem;
a communication subsystem;
a user input device; and
non-transitory memory, wherein the non-transitory memory comprises instructions that when executed by the logic subsystem cause the logic subsystem to:
select one or more spreadsheet cells based on user input received via the user input device, wherein the one or more spreadsheet cells comprise a first text expression, and wherein the spreadsheet cells are within a spreadsheet stored in the non-transitory memory of the computing system;
convert the first text expression into a first 2D configuration, wherein the first 2D configuration comprises a plurality of 2D elements, wherein the first 2D configuration represents the syntactic relationship between the plurality of 2D elements; and
display the first 2D configuration via a graphical user interface on the display subsystem, wherein the spreadsheet and the graphical user interface are different;
receive a selection of a second 2D configuration via the user input device;
receive a selection of a region of spreadsheet cells of the spreadsheet via the user input device, wherein the region of spreadsheet cells comprises a plurality of text expressions;
compare the plurality of text expressions with the second 2D configuration; and
respond to a text expression of a spreadsheet cell of the region of spreadsheet cells matching the second 2D configuration by:
highlighting the spreadsheet cell; and
displaying the highlighted spreadsheet cell via the display subsystem.

17. The computing system of claim 16, wherein the non-transitory memory further comprises a library of pre-defined 2D elements mapping to a plurality of syntactic elements.

18. The computing system of claim 16, wherein the computing system is a first computing system, and wherein the first computing system is communicatively coupled to a second computing system via the communication subsystem, and wherein the instructions, when executed by the logic subsystem, further cause the logic subsystem to:
display the spreadsheet via the second computing system;
receive a selection from the second computing system of the one or more spreadsheet cells comprising the first text expression;
convert the first text expression into the first 2D configuration; and
display the first 2D configuration via the second computing system.

19. The first computing system of claim 18, wherein the instructions, when executed by the logic subsystem, further cause the logic subsystem to: modify a position of one or more of the plurality of 2D elements to transform the first 2D configuration into a second 2D configuration based on input from the second computing system; convert the second 2D configuration into a second text expression; update the one or more spreadsheet cells with the second text expression; and display the second text expression via both the first computing system and the second computing system.

* * * * *